United States Patent
Galvez et al.

(10) Patent No.: US 12,055,906 B2
(45) Date of Patent: *Aug. 6, 2024

(54) BUILDING MANAGEMENT SYSTEM WITH FLEXIBLE GATEWAY CONFIGURATION

(71) Applicant: Tyco Fire & Security GmbH, Schaffhausen (CH)

(72) Inventors: Miguel Galvez, Westford, MA (US); Eric G. Lang, Milwaukee, WI (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/204,632

(22) Filed: Jun. 1, 2023

(65) Prior Publication Data

US 2024/0004357 A1  Jan. 4, 2024

Related U.S. Application Data

(63) Continuation of application No. 17/710,782, filed on Mar. 31, 2022, now Pat. No. 11,711,269.
(Continued)

(51) Int. Cl.
*H04L 41/0853* (2022.01)
*G05B 15/02* (2006.01)
(Continued)

(52) U.S. Cl.
CPC ....... *G05B 15/02* (2013.01); *G08B 13/19656* (2013.01); *H04L 12/66* (2013.01);
(Continued)

(58) Field of Classification Search
CPC .................. H04L 41/0853; G05B 2219/31093
(Continued)

(56) References Cited

U.S. PATENT DOCUMENTS 11,150,617 B2  10/2021  Ploegert et al.
11,444,871 B1   9/2022  Nainar et al.
(Continued)

FOREIGN PATENT DOCUMENTS

EP  4 226 263 A1  8/2023
WO  WO-2022/103812 A1  5/2022
(Continued)

OTHER PUBLICATIONS

International Search Report and Written Opinion on PCT Appl. No. PCT/US2022/054323 dated May 4, 2023 (16 pages).

*Primary Examiner* — Hee Soo Kim
(74) *Attorney, Agent, or Firm* — Foley & Lardner LLP

(57) ABSTRACT

Systems and methods for building management utilizing adaptive edge processing are disclosed. The building system can store gateway components on storage devices. The gateway components can facilitate communication with a cloud platform and facilitate communication with a physical building device. The building system can identify a computing system of the building that is in communication with the physical building device. The physical building device can store one or more data samples. The building system can deploy the gateway components to the computing system responsive to identifying that the computing system is in communication with the physical building device. The gateway components can cause the computing system to communicate with the physical building device to receive the one or more data samples and cause the computing system to communicate the one or more data samples to the cloud platform.

20 Claims, 19 Drawing Sheets

Related U.S. Application Data

(60) Provisional application No. 63/296,078, filed on Jan. 3, 2022.

(51) Int. Cl.

| | | |
|---|---|---|
| *G08B 13/196* | (2006.01) | |
| *H04L 12/66* | (2006.01) | |
| *H04L 41/0803* | (2022.01) | |
| *H04L 41/12* | (2022.01) | |
| *H04L 67/00* | (2022.01) | |
| *H04L 67/10* | (2022.01) | |
| *H04L 67/12* | (2022.01) | |
| *H04L 67/60* | (2022.01) | |
| *H04W 4/029* | (2018.01) | |
| *H04W 24/02* | (2009.01) | |
| *H04W 48/18* | (2009.01) | |
| *H04W 88/16* | (2009.01) | |

(52) U.S. Cl.
CPC ...... *H04L 41/0803* (2013.01); *H04L 41/0853* (2013.01); *H04L 41/12* (2013.01); *H04L 67/10* (2013.01); *H04L 67/12* (2013.01); *H04L 67/34* (2013.01); *H04L 67/60* (2022.05); *H04W 4/029* (2018.02); *H04W 24/02* (2013.01); *H04W 48/18* (2013.01); *H04W 88/16* (2013.01)

(58) Field of Classification Search
USPC .......................................................... 709/223
See application file for complete search history.

(56) References Cited

U.S. PATENT DOCUMENTS

| | | | |
|---|---|---|---|
| 11,499,738 B2 | 11/2022 | Ratakonda et al. | |
| 11,556,105 B2 | 1/2023 | Cooley et al. | |
| 11,561,522 B2 | 1/2023 | Cooley et al. | |
| 11,561,523 B2 | 1/2023 | Cooley et al. | |
| 11,573,551 B2 | 2/2023 | Cooley et al. | |
| 11,586,167 B2 | 2/2023 | Cooley et al. | |
| 2003/0200285 A1* | 10/2003 | Hansen | H04L 41/0806 709/220 |
| 2008/0265799 A1 | 10/2008 | Sibert | |
| 2010/0016683 A1 | 1/2010 | Lemmers et al. | |
| 2013/0081541 A1 | 4/2013 | Hasenoehrl et al. | |
| 2013/0212129 A1 | 8/2013 | Lawson et al. | |
| 2014/0050229 A1 | 2/2014 | Kon et al. | |
| 2014/0336795 A1 | 11/2014 | Asenjo et al. | |
| 2017/0295058 A1 | 10/2017 | Gottschalk et al. | |
| 2018/0191521 A1* | 7/2018 | Ahmed | H04L 12/2809 |
| 2018/0285800 A1 | 10/2018 | Wenzel et al. | |
| 2018/0309627 A1 | 10/2018 | Yarbrough et al. | |
| 2019/0074994 A1 | 3/2019 | Becker et al. | |
| 2019/0094827 A1 | 3/2019 | Park et al. | |
| 2019/0207866 A1 | 7/2019 | Pathak et al. | |
| 2019/0250575 A1 | 8/2019 | Jonsson | |
| 2019/0306024 A1 | 10/2019 | Petria et al. | |
| 2019/0356502 A1 | 11/2019 | Nair et al. | |
| 2019/0356550 A1* | 11/2019 | Stanciu | H04L 41/0866 |
| 2020/0125043 A1 | 4/2020 | Park | |
| 2020/0133978 A1 | 4/2020 | Ramamurti et al. | |
| 2020/0162354 A1 | 5/2020 | Drees et al. | |
| 2020/0167148 A1 | 5/2020 | Park et al. | |
| 2021/0144210 A1 | 5/2021 | Kolhapure et al. | |
| 2021/0191826 A1 | 6/2021 | Duraisingh et al. | |
| 2021/0200169 A1 | 7/2021 | Ploegert et al. | |
| 2021/0200807 A1 | 7/2021 | Ploegert et al. | |
| 2021/0373509 A1 | 12/2021 | Borah et al. | |
| 2021/0373510 A1 | 12/2021 | Borah et al. | |
| 2021/0382449 A1 | 12/2021 | Krishnan et al. | |
| 2021/0382451 A1 | 12/2021 | Bharathi et al. | |
| 2021/0382452 A1* | 12/2021 | Krishnan | G05B 19/0421 |
| 2021/0382474 A1 | 12/2021 | Krishnan et al. | |
| 2021/0389968 A1 | 12/2021 | Majewski et al. | |
| 2021/0390203 A1 | 12/2021 | Palanivel et al. | |
| 2022/0004445 A1 | 1/2022 | George et al. | |
| 2022/0092500 A1 | 3/2022 | Drees et al. | |
| 2022/0147000 A1 | 5/2022 | Cooley et al. | |
| 2022/0150124 A1 | 5/2022 | Cooley et al. | |
| 2022/0171995 A1 | 6/2022 | Balasubramanian et al. | |
| 2022/0179479 A1 | 6/2022 | Ricart et al. | |
| 2022/0179646 A1 | 6/2022 | Fox | |
| 2022/0179683 A1 | 6/2022 | Verma et al. | |
| 2022/0182278 A1 | 6/2022 | Vangapalli et al. | |
| 2022/0268470 A1 | 8/2022 | Hriljac et al. | |

FOREIGN PATENT DOCUMENTS

| | | |
|---|---|---|
| WO | WO-2022/103813 A1 | 5/2022 |
| WO | WO-2022/103820 A1 | 5/2022 |
| WO | WO-2022/103822 A1 | 5/2022 |
| WO | WO-2022/103824 A1 | 5/2022 |
| WO | WO-2022/103829 A1 | 5/2022 |
| WO | WO-2022/103831 A1 | 5/2022 |

\* cited by examiner

BUILDING MANAGEMENT SYSTEM WITH FLEXIBLE GATEWAY CONFIGURATION

CROSS-REFERENCE TO RELATED APPLICATIONS

The present disclosure is a continuation of and claims priority to U.S. patent application Ser. No. 17/710,782 filed Mar. 31, 2022, titled "BUILDING MANAGEMENT SYSTEM WITH FLEXIBLE GATEWAY CONFIGURATION," which itself claims the benefit of and priority to U.S. Provisional Patent Application No. 63/296,078, filed Jan. 3, 2022, the contents of each of which are hereby incorporated by reference in their entirety for all purposes.

BACKGROUND

The present disclosure relates generally to a building management system (BMS) that operates for a building.

The BMS can operate to collect data from subsystems of a building and/or operate based on the collected data. In some embodiments, the BMS may utilize a gateway device. The gateway device may manage the collection of data points of the subsystems of a building. The gateway device can provide collected data points of the subsystems to the BMS. The BMS may, in some embodiments, operate based on the collected data and/or push new values for data points down to the subsystem through the gateway.

SUMMARY

At least one aspect of the present disclosure is directed to a building system of a building including one or more storage devices. The one or more storage devices can instructions that, when executed by one or more processors, cause the one or more processors to perform one or more operations. The one or more processors can store one or more gateway components on the one or more storage devices. The one or more gateway components can facilitate communication with a cloud platform and facilitate communication with a physical building device. The one or more processors can identify a computing system of the building that is in communication with the physical building device. The physical building device can store one or more data samples. The one or more processors can deploy the one or more gateway components to the computing system responsive to identifying that the computing system is in communication with the physical building device. The one or more gateway components can cause the computing system to communicate with the physical building device to receive the one or more data samples. The one or more gateway components can cause the computing system to communicate the one or more data samples to the cloud platform.

In some implementations, the one or more processors can identify one or more communication protocols of one or more physical building devices that collect the one or more data samples. In some implementations, the one or more processors can deploy one or more integration components for the one or more communication protocols to the computing system to cause the computing system to communicate with the one or more physical building devices via the one or more communication protocols.

In some implementations, the one or more processors can deploy an adapter service to the computing system, wherein the adapter service causes the computing system to communicate with a network engine and receive the one or more data samples from the network engine, the network engine configured to manage one or more building networks and receive the one or more data samples from one or more devices of the building via the one or more building networks.

In some implementations, the one or more gateway components can detect a new physical building device connected to the computing system. In some implementations, the one or more gateway components can search a device library for a configuration of the new physical building device. In some implementations, the one or more gateway components can perform at least one of: implementing the configuration to facilitate communication with the new physical building device responsive to identifying the configuration for the new physical building device in the device library; or perform a discovery process to discover the configuration for the new physical building device and store the configuration in the device library.

In some implementations, the device library is stored in at least one of the cloud platform or on the one or more gateway components. In some implementations, the device library is distributed across a plurality of instances of the one or more gateway components in a plurality of different buildings. In some implementations, the one or more gateway components include a building service configured to generate data based on the one or more data samples.

In some implementations, the one or more processors can identify one or more requirements for the building service. The one or more requirements can indicate at least one of processing resources, storage resources, data availability, or a presence of another building service. In some implementations, the one or more processors can determine that the computing system meets the one or more requirements. In some implementations, the one or more processors can deploy the building service to the computing system responsive to determining that the computing system meets the one or more requirements.

In some implementations, the one or more processors can identify that the one or more requirements for the building service are no longer met by the computing system. In some implementations, the one or more processors can move the building service from the computing system to a second computing system that meets the one or more requirements of the building service. In some implementations, the one or more gateway components cause the computing system to receive one or more values for control points of the physical building device; and communicate the one or more values to the control points of the physical building device via the one or more gateway components.

At least one other aspect is directed to a method implemented by a building system of a building including one or more storage devices. The method can be performed, for example, by one or more processors of the building system. The method can include storing one or more gateway components on the one or more storage devices. The one or more gateway components can be configured to facilitate communication with a cloud platform and facilitate communication with a physical building device. The method can include identifying a computing system of the building that is in communication with the physical building device, the physical building device storing one or more data samples. The method can include deploying the one or more gateway components to the computing system responsive to identifying that the computing system is in communication with the physical building device. The one or more gateway components can cause the computing system to communicate with the physical building device to receive the one or more data samples. The one or more gateway components can cause the computing system to communicate the one or more data samples to the cloud platform.

In some implementations, the method can include identifying one or more communication protocols of one or more physical building devices that collect the one or more data samples. In some implementations, the method can include deploying one or more integration components for the one or more communication protocols to the computing system to cause the computing system to communicate with the one or more physical building devices via the one or more communication protocols.

In some implementations, the method can include deploying an adapter service to the computing system. In some implementations, the adapter service causes the computing system to communicate with a network engine and receive the one or more data samples from the network engine. The network engine can be configured to manage one or more building networks and receive the one or more data samples from one or more devices of the building via the one or more building networks.

In some implementations, the one or more gateway components can detect a new physical building device connected to the computing system. In some implementations, the one or more gateway components can search a device library for a configuration of the new physical building device. In some implementations, the one or more gateway components can perform at least one of: implementing the configuration to facilitate communication with the new physical building device responsive to identifying the configuration for the new physical building device in the device library; or perform a discovery process to discover the configuration for the new physical building device and store the configuration in the device library.

In some implementations, the device library is stored in at least one of the cloud platform or on the one or more gateway components. In some implementations, the device library is distributed across a plurality of instances of the one or more gateway components in a plurality of different buildings. In some implementations, the one or more gateway components include a building service configured to generate data based on the one or more data samples.

In some implementations, the method can include identifying one or more requirements for the building service, the one or more requirements indicating at least one of processing resources, storage resources, data availability, or a presence of another building service. In some implementations, the method can include determining, by the one or more processors, that the computing system meets the one or more requirements. In some implementations, the method can include deploying the building service to the computing system responsive to determining that the computing system meets the one or more requirements.

In some implementations, the method can include identifying that the one or more requirements for the building service are no longer met by the computing system. In some implementations, the method can include moving the building service from the computing system to a second computing system that meets the one or more requirements of the building service. In some implementations, the one or more gateway components can cause the computing system to receive one or more values for control points of the physical building device. In some implementations, the one or more gateway components can cause the computing system to communicate the one or more values to the control points of the physical building device via the one or more gateway components.

At least one other aspect of the present disclosure is directed to yet another building system of a building including one or more storage devices. The one or more storage devices can store instructions that, when executed by one or more processors, cause the one or more processors to perform one or more operations. The one or more processors can store one or more gateway components on the one or more storage devices. The one or more gateway components can be configured to facilitate communication between a cloud platform and a physical building device that the one or more gateway components are deployed on. The one or more gateway components can provide an interface with one or more existing components of the physical building device. The one or more processors can deploy the one or more gateway components to a building management system (BMS) server of the building. The BMS server can be configured to receive one or more data samples from one or more physical building devices of the building and execute one or more BMS applications based on the one or more data samples. The one or more gateway components can interface with one or more existing components of the BMS server, receive the one or more data samples based on the one or more gateway components interfacing with the one or more existing components of the BMS server, and communicate the one or more data samples to the cloud platform.

In some implementations, the one or more gateway components cause the BMS server to receive one or more values for control points of the physical building device; and communicate the one or more values to the control points of the physical building device via the one or more gateway components. In some implementations, the one or more gateway components cause the BMS server to receive the one or more values for the control points of the physical building device from at least one of the cloud platform or a local control algorithm run locally on the BMS server via the one or more gateway components.

In some implementations, the one or more processors can identify one or more communication protocols of the one or more physical building devices that collect the one or more data samples; and deploy one or more integration components for the one or more communication protocols to the BMS server to cause the BMS server to communicate with the one or more physical building devices via the one or more communication protocols.

In some implementations, the one or more processors can deploy an adapter service to the BMS server. The adapter service can cause the BMS server to communicate with a network engine and receive the one or more data samples from the network engine. The network engine can be configured to manage one or more building networks and receive the one or more data samples from one or more devices of the building via the one or more building networks.

In some implementations, the one or more gateway components can detect a new physical building device connected to the BMS server. In some implementations, the one or more gateway components can search a device library for a configuration of the new physical building device. In some implementations, the one or more gateway components can perform at least one of: implementing the configuration to facilitate communication with the new physical building device responsive to identifying the configuration for the new physical building device in the device library; or perform a discovery process to discover the configuration for the new physical building device and store the configuration in the device library.

In some implementations, the device library is stored in at least one of the cloud platform or on the one or more gateway components. In some implementations, the one or more gateway components include a building service configured to generate data based on the one or more data samples. In some implementations, the one or more processors can identify one or more requirements for the building service, the one or more requirements indicating at least one of processing resources, storage resources, data availability, or a presence of another building service; and deploy the building service to the BMS server responsive to determining that the BMS server meets one or more requirements for the building service.

In some implementations, the one or more processors to can identify that the one or more requirements for the building service are no longer met by the BMS server; and remove the building service from the BMS server.

At least one other aspect of the present disclosure is directed to yet another method. The method can be implemented by a building system of a building including one or more storage devices. The method may be performed, for example, by one or more processors of the building system. The method can include storing, one or more gateway components on the one or more storage devices. The one or more gateway components can be configured to facilitate communication between a cloud platform and a physical building device that the one or more gateway components are deployed on, the one or more gateway components providing an interface with one or more existing components of the physical building device. The method can include deploying the one or more gateway components to a building management system (BMS) server of the building, the BMS server configured to receive one or more data samples from one or more physical building devices of the building and execute one or more BMS applications based on the one or more data samples. The one or more gateway components can interface with one or more existing components of the BMS server, receive the one or more data samples based on the one or more gateway components interfacing with the one or more existing components of the BMS server, and communicate the one or more data samples to the cloud platform.

In some implementations, the one or more gateway components cause the BMS server to receive one or more values for control points of the physical building device; and communicate the one or more values to the control points of the physical building device via the one or more gateway components. In some implementations, the one or more gateway components cause the BMS server to receive the one or more values for the control points of the physical building device from at least one of the cloud platform or a local control algorithm run locally on the BMS server via the one or more gateway components.

In some implementations, the method can include identifying, by the one or more processors, one or more communication protocols of the one or more physical building devices that collect the one or more data samples. In some implementations, the method can include deploying one or more integration components for the one or more communication protocols to the BMS server to cause the BMS server to communicate with the one or more physical building devices via the one or more communication protocols.

In some implementations, the method can include deploying an adapter service to the BMS server. In some implementations, the adapter service can cause the BMS server to communicate with a network engine and receive the one or more data samples from the network engine. In some implementations, the network engine can be configured to manage one or more building networks and receive the one or more data samples from one or more devices of the building via the one or more building networks.

In some implementations, the one or more gateway components can detect a new physical building device connected to the BMS server. In some implementations, the one or more gateway components can search a device library for a configuration of the new physical building device. In some implementations, the one or more gateway components can perform at least one of: implementing the configuration to facilitate communication with the new physical building device responsive to identifying the configuration for the new physical building device in the device library; or perform a discovery process to discover the configuration for the new physical building device and store the configuration in the device library.

In some implementations, the device library is stored in at least one of the cloud platform or on the one or more gateway components. In some implementations, the one or more gateway components include a building service configured to generate data based on the one or more data samples. In some implementations, the method can include identifying one or more requirements for the building service, the one or more requirements indicating at least one of processing resources, storage resources, data availability, or a presence of another building service. In some implementations, the method can include deploying the building service to the BMS server responsive to determining that the BMS server meets one or more requirements for the building service.

In some implementations, the method can include identifying that the one or more requirements for the building service are no longer met by the BMS server. In some implementations, the method can include removing, by the one or more processors, the building service from the BMS server.

At least one other aspect of the present disclosure is directed to another building system of a building including one or more storage devices. The one or more storage devices can instructions that, when executed by one or more processors, cause the one or more processors to perform one or more operations. The one or more processors can store one or more gateway components on the one or more storage devices. The one or more gateway components can be configured to facilitate communication between a cloud platform and a building device that the one or more gateway components are deployed on. The one or more gateway components can provide an interface with one or more existing components of the building device. The one or more processors deploy the one or more gateway components to a building network engine. The building network engine can implement one or more local communications networks for one or more building devices of the building and receive one or more data samples from the one or more building devices. The one or more gateway components interface with the one or more existing components of the building network engine, receive the one or more data samples based on the one or more gateway components interfacing with the one or more existing components of the building network engine, and communicate the one or more data samples to the cloud platform.

In some implementations, the one or more gateway components can receive one or more values for control points of the building device. In some implementations, the one or more gateway components can communicate the one or more values to the control points of the building device via the one or more gateway components. In some implementations, the one or more gateway components can the building network engine to receive the one or more values for the control points of the building device from at least one of the cloud platform.

In some implementations, the one or more processors can deploy an adapter service to the building network engine. In some implementations, the adapter service causes the building network engine to communicate with the cloud platform and provide the one or more data samples to the cloud platform. In some implementations, the adapter service causes the building network engine to communicate with a BMS server and provide the one or more data samples to the BMS server. In some implementations, the adapter service causes the building network engine to communicate with a computing device of the building.

In some implementations, the one or more gateway components can detect a new physical building device connected to the building network engine. In some implementations, the one or more gateway components can search a device library for a configuration of the new physical building device. In some implementations, the one or more gateway components can perform at least one of: implementing the configuration to facilitate communication with the new physical building device responsive to identifying the configuration for the new physical building device in the device library; or perform a discovery process to discover the configuration for the new physical building device and store the configuration in the device library.

In some implementations, the device library is stored in at least one of the cloud platform or on the one or more gateway components. In some implementations, the one or more gateway components include a building service configured to generate data based on the one or more data samples.

At least one other aspect of the present disclosure is directed to another method implemented by a building system of a building including one or more storage devices. The method can include storing one or more gateway components on the one or more storage devices. The one or more gateway components can facilitate communication between a cloud platform and a building device that the one or more gateway components are deployed on. The one or more gateway components can provide an interface with one or more existing components of the building device. The method can include deploying the one or more gateway components to a building network engine. The building network engine can implement one or more local communications networks for one or more building devices of the building and receive one or more data samples from the one or more building devices. The one or more gateway components interface with the one or more existing components of the building network engine, receive the one or more data samples based on the one or more gateway components interfacing with the one or more existing components of the building network engine, and communicate the one or more data samples to the cloud platform.

In some implementations, the one or more gateway components can receive one or more values for control points of the building device. In some implementations, the one or more gateway components can communicate the one or more values to the control points of the building device via the one or more gateway components. In some implementations, the one or more gateway components can cause the building network engine to receive the one or more values for the control points of the building device from at least one of the cloud platform.

In some implementations, the method can include deploying an adapter service to the building network engine. In some implementations, the adapter service causes the building network engine to communicate with the cloud platform and provide the one or more data samples to the cloud platform. In some implementations, the adapter service causes the building network engine to communicate with a BMS server and provide the one or more data samples to the BMS server. In some implementations, the adapter service causes the building network engine to communicate with a computing device of the building.

In some implementations, the one or more gateway components can detect a new physical building device connected to the building network engine. In some implementations, the one or more gateway components can search a device library for a configuration of the new physical building device. In some implementations, the one or more gateway components can perform at least one of: implementing the configuration to facilitate communication with the new physical building device responsive to identifying the configuration for the new physical building device in the device library; or perform a discovery process to discover the configuration for the new physical building device and store the configuration in the device library. In some implementations, the device library is stored in at least one of the cloud platform or on the one or more gateway components. In some implementations, the one or more gateway components include a building service configured to generate data based on the one or more data samples.

At least one aspect of the present disclosure is directed to building system of a building including one or more storage devices. The one or more storage devices can store instructions that, when executed by one or more processors, cause the one or more processors to perform one or more operations. The one or more processors can store one or more gateway components on the one or more storage devices. The one or more gateway components can facilitate communication between a cloud platform and a physical building device. The one or more processors can deploy the one or more gateway components to a physical gateway. The physical gateway configured to communicate with one or more building devices and receive one or more data samples from the one or more building devices. The one or more gateway components can receive the one or more data samples and communicate the one or more data samples to the cloud platform. The one or more processors can identify that a building device of the building running one or more services does not meet one or more requirements for running the one or more services. The one or more processors can cause the one or more services executing on the building device to be relocated to the physical gateway such that the one or more gateway components execute the one or more services.

In some implementations, the one or more processors can identify one or more communication protocols of the one or more building devices that collect the one or more data samples. In some implementations, the one or more processors can deploy one or more integration components for the one or more communication protocols to the physical gateway to cause the physical gateway to communicate with the one or more building devices via the one or more communication protocols.

In some implementations, the one or more processors can deploy an adapter service to the physical gateway. In some implementations, the adapter service causes the physical gateway to communicate with a network engine and receive the one or more data samples from the network engine. In some implementations, the network engine can manage one or more building networks and receive the one or more data samples from one or more second building devices of the building via the one or more building networks. In some implementations, the adapter service causes the physical gateway to communicate with the cloud platform and communicate the one or more data samples to the cloud platform via the adapter service.

In some implementations, the one or more gateway components can detect a new physical building device connected to the physical gateway. In some implementations, the one or more gateway components can search a device library for a configuration of the new physical building device. In some implementations, the one or more gateway components can perform at least one of: implementing the configuration to facilitate communication with the new physical building device responsive to identifying the configuration for the new physical building device in the device library; or perform a discovery process to discover the configuration for the new physical building device and store the configuration in the device library.

In some implementations, the device library is stored in at least one of the cloud platform or on the one or more gateway components. In some implementations, the device library is distributed across a plurality of instances of the one or more gateway components in a plurality of different buildings. In some implementations, one or more gateway components include a building service configured to generate data based on the one or more data samples.

In some implementations, the one or more processors can identify one or more requirements for the building service. The one or more requirements can indicate at least one of processing resources, storage resources, data availability, or a presence of another building service. In some implementations, the one or more processors can determine that the physical gateway meets the one or more requirements. In some implementations, the one or more processors can deploy the building service to the physical gateway responsive to determining that the physical gateway meets the one or more requirements.

At least one aspect of the present disclosure a method implemented by a building system of a building including one or more storage devices. The method can include storing one or more gateway components on the one or more storage devices. The one or more gateway components can facilitate communication between a cloud platform and a physical building device. The method can include deploying the one or more gateway components to a physical gateway. The physical gateway configured to communicate with one or more building devices and receive one or more data samples from the one or more building devices. The one or more gateway components can receive the one or more data samples and communicate the one or more data samples to the cloud platform. The method can include identifying that a building device of the building running one or more services does not meet one or more requirements for running the one or more services. The method can include causing the one or more services executing on the building device to be relocated to the physical gateway such that the one or more gateway components execute the one or more services.

In some implementations, the method can include identifying one or more communication protocols of the one or more building devices that collect the one or more data samples. In some implementations, the method can include deploying one or more integration components for the one or more communication protocols to the physical gateway to cause the physical gateway to communicate with the one or more building devices via the one or more communication protocols.

In some implementations, the method can include deploying an adapter service to the physical gateway. In some implementations, the adapter service causes the physical gateway to communicate with a network engine and receive the one or more data samples from the network engine. In some implementations, the network engine can manage one or more building networks and receive the one or more data samples from one or more second building devices of the building via the one or more building networks. In some implementations, the adapter service causes the physical gateway to communicate with the cloud platform and communicate the one or more data samples to the cloud platform via the adapter service.

In some implementations, the one or more gateway components can detect a new physical building device connected to the physical gateway. In some implementations, the one or more gateway components can search a device library for a configuration of the new physical building device. In some implementations, the one or more gateway components can perform at least one of: implementing the configuration to facilitate communication with the new physical building device responsive to identifying the configuration for the new physical building device in the device library; or perform a discovery process to discover the configuration for the new physical building device and store the configuration in the device library.

In some implementations, the device library is stored in at least one of the cloud platform or on the one or more gateway components. In some implementations, the device library is distributed across a plurality of instances of the one or more gateway components in a plurality of different buildings. In some implementations, the one or more gateway components can include a building service configured to generate data based on the one or more data samples. In some implementations, the method can include identifying one or more requirements for the building service. In some implementations, the one or more requirements indicating at least one of processing resources, storage resources, data availability, or a presence of another building service. In some implementations, the method can include determining that the physical gateway meets the one or more requirements. In some implementations, the method can include deploying the building service to the physical gateway responsive to determining that the physical gateway meets the one or more requirements.

At least one aspect of the present disclosure is directed to a building device of a building including one or more storage devices. The one or more storage devices can store instructions that, when executed by one or more processors, cause the one or more processors to perform one or more operations. The one or more processors can receive one or more gateway components and implement the one or more gateway components on the building device. The one or more gateway components can facilitate communication between a cloud platform and the building device. The one or more processors can identify a physical device connected to the building device based on the one or more gateway components. The one or more processors can search a library of configurations for a plurality of different physical devices with the identity of the physical device to identify a configuration for collecting data samples from the physical device connected to the building device and retrieve the configuration. The one or more processors can implement the configuration for the one or more gateway components. The one or more processors can collect one or more data samples from the physical device based on the one or more gateway components and the configuration.

In some implementations, the one or more processors can receive an integration component for a communication protocol corresponding to the physical device. In some implementations, the one or more processors can communicate with the physical device via the communication protocol. In some implementations, the one or more processors can receive an adapter service, the adapter service configured to facilitate communication with one or more computing devices. In some implementations, the adapter service is configured to facilitate communication with a network engine and receive the one or more data samples via the network engine. the adapter service is configured to facilitate communication with a BMS server and provide the one or more data samples to the BMS server.

In some implementations, the one or more processors can detect a new physical device connected to the building device. In some implementations, the one or more processors can search the library for a configuration of the new physical device. In some implementations, the one or more processors can perform at least one of: implementing the configuration to facilitate communication with the new physical device responsive to identifying the configuration for the new physical device in the library; or perform a discovery process to discover the configuration for the new physical device and store the configuration in the library. In some implementations, the library is stored in at least one of the cloud platform or on the one or more gateway components.

In some implementations, the library is distributed across a plurality of instances of the one or more gateway components in a plurality of different buildings. In some implementations, the one or more processors can execute a building service configured to generate data based on the one or more data samples. In some implementations, the one or more processors to receive the building service from the cloud platform.

At least one aspect of the present disclosure is directed to another method implemented by a building device of a building including one or more storage devices. The method can be performed, for example, by one or more processors of the building device. The method can include receiving one or more gateway components and implement the one or more gateway components on the building device, the one or more gateway components configured to facilitate communication between a cloud platform and the building device. The method can include identifying, by the one or more processors, a physical device connected to the building device based on the one or more gateway components. The method can include searching a library of configurations for a plurality of different physical devices with the identity of the physical device to identify a configuration for collecting data samples from the physical device connected to the building device and retrieve the configuration. The method can include implementing the configuration for the one or more gateway components. The method can include collecting one or more data samples from the physical device based on the one or more gateway components and the configuration.

In some implementations, the method can include receiving an integration component for a communication protocol corresponding to the physical device. In some implementations, the method can include communicating with the physical device via the communication protocol. In some implementations, the method can include receiving an adapter service, the adapter service configured to facilitate communication with one or more computing devices. In some implementations, the adapter service is configured to facilitate communication with a network engine and receive the one or more data samples via the network engine. In some implementations, the adapter service is configured to facilitate communication with a BMS server and provide the one or more data samples to the BMS server.

In some implementations, the method can include detecting a new physical device connected to the building device. In some implementations, the method can searching the library for a configuration of the new physical device. In some implementations, the method can performing at least one of: implementing the configuration to facilitate communication with the new physical device responsive to identifying the configuration for the new physical device in the library; or perform a discovery process to discover the configuration for the new physical device and store the configuration in the library.

In some implementations, the library is stored in at least one of the cloud platform or on the one or more gateway components. In some implementations, the library is distributed across a plurality of instances of the one or more gateway components in a plurality of different buildings. In some implementations, the method can include executing a building service configured to generate data based on the one or more data samples. In some implementations, the method can include receiving the building service from the cloud platform.

At least one other aspect of the present disclosure is directed to another building system of a building including one or more storage devices. The one or more storage devices can store instructions that, when executed by one or more processors, cause the one or more processors to perform one or more operations. The one or more processors can store one or more gateway components on the one or more storage devices, the one or more gateway components performing one or more gateway functions. The one or more processors can deploy a first instance of the one or more gateway components to a first edge device and a second instance of the one or more gateway components to a second edge device. The first edge device can measure a first condition of the building and the second edge device can control the first condition or a second condition of the building, The first instance of the one or more gateway components can cause the first edge device to communicate an event to the second edge device responsive to a rule being triggered associated with the first condition. The second instance of the one or more gateway components can cause the second edge device to control the first condition or the second condition responsive to receiving the event.

In some implementations, the first instance of the one or more gateway components includes a cloud connector configured to facilitate communication between a cloud platform and the first edge device. In some implementations, the first instance of the one or more gateway components includes an adapter configured to interface between components of the first edge device and a building device broker. In some implementations, the building system can include a building device broker that facilitates communication between the first edge device and the second edge device. In some implementations, the one or more processors can deploy an endpoint to a local building server. In some implementations, the one or more processors can cause the first instance of the one or more gateway components to communicate the first condition to the local building server based on the endpoint deployed to the local building server.

In some implementations, the first edge device is a surveillance camera, and the first condition is a presence of a person in the building. In some implementations, the one or more processors can identify a communication protocol of the first edge device that measures the first condition. In some implementations, the one or more processors can deploy an integration component for the communication protocol to the first edge device to cause the first edge device to communicate with the second edge device via the communication protocol.

In some implementations, the first instance of the one or more gateway components includes a building service configured to generate data based on the first condition. In some implementations, the second edge device is a smart thermostat, and the second condition is a temperature setting of the building. In some implementations, the first instance of the one or more gateway components causes the first edge device to communicate the event to the second edge device via a building device broker.

At least one other aspect of the present disclosure is directed to yet another method implemented by a building system of a building including one or more storage devices. The method may be performed, for example, by one or more processors of the building system. The method can include storing one or more gateway components on the one or more storage devices, the one or more gateway components performing one or more gateway functions.

In some implementations, deploying a first instance of the one or more gateway components to a first edge device and a second instance of the one or more gateway components to a second edge device. The first edge device can measure a first condition of the building and the second edge device can control the first condition or a second condition of the building. The first instance of the one or more gateway components can cause the first edge device to communicate an event to the second edge device responsive to a rule being triggered associated with the first condition. The second instance of the one or more gateway components can cause the second edge device to control the first condition or the second condition responsive to receiving the event.

In some implementations, the first instance of the one or more gateway components includes a cloud connector configured to facilitate communication between a cloud platform and the first edge device. In some implementations, the first instance of the one or more gateway components includes an adapter configured to interface between components of the first edge device and a building device broker. In some implementations, the first instance of the one or more gateway components causes the first edge device to communicate via a building device broker that facilitates communication between the first edge device and the second edge device.

In some implementations, the method can include deploying an endpoint to a local building server. In some implementations, the method can include causing the first instance of the one or more gateway components to communicate the first condition to the local building server based on the endpoint deployed to the local building server. In some implementations, the first edge device is a surveillance camera, and the first condition is a presence of a person in the building. In some implementations, the method can include identifying a communication protocol of the first edge device that measures the first condition. In some implementations, deploying an integration component for the communication protocol to the first edge device to cause the first edge device to communicate with the second edge device via the communication protocol.

In some implementations, the first instance of the one or more gateway components includes a building service configured to generate data based on the first condition. In some implementations, the second edge device is a smart thermostat, and the second condition is a temperature setting of the building. In some implementations, the first instance of the one or more gateway components causes the first edge device to communicate the event to the second edge device via a building device broker.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Figure 1:
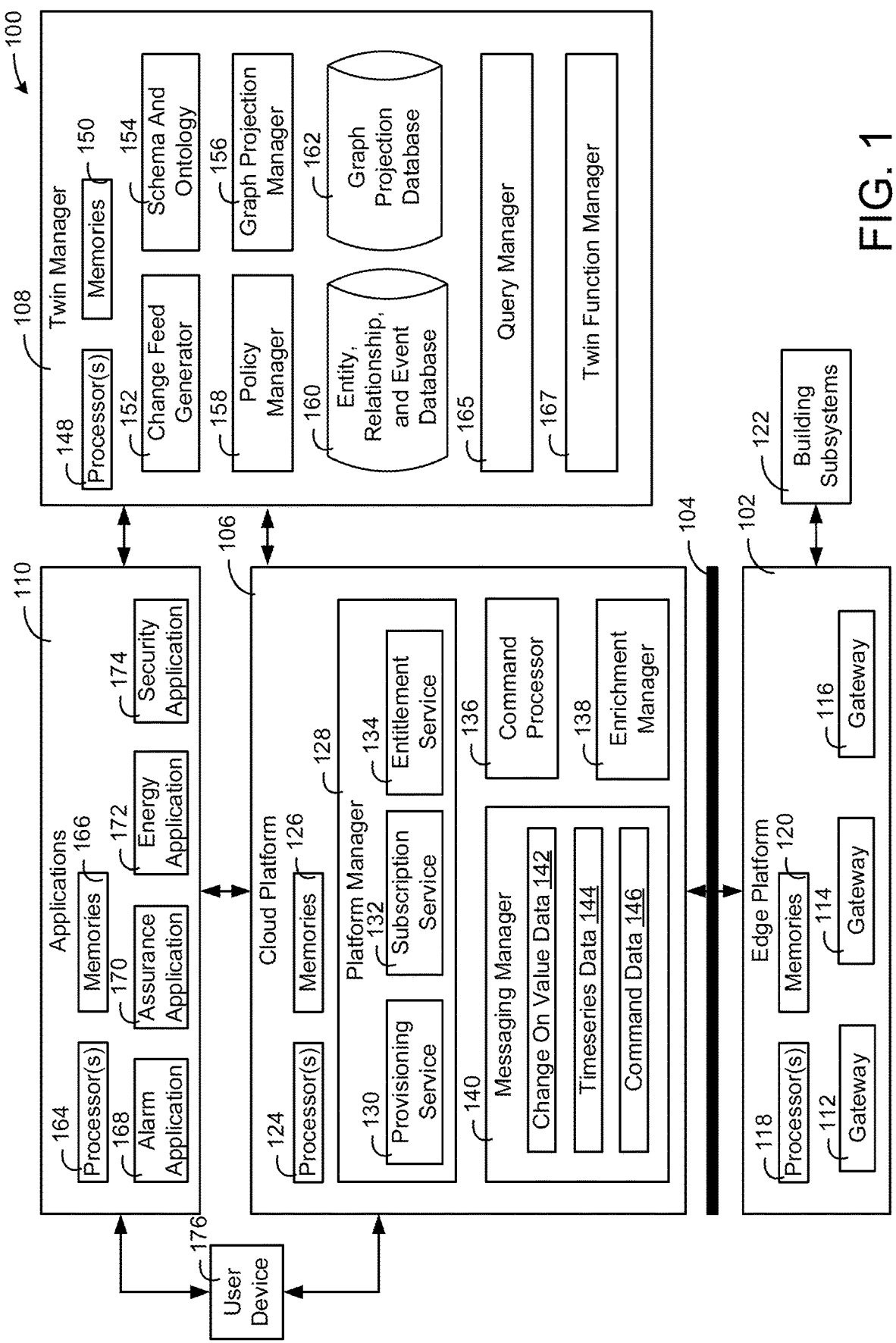
FIG. 1 is a block diagram of a building data platform including an edge platform, a cloud platform, and a twin manager, according to an exemplary embodiment.

Referring generally to the FIGURES, systems and methods for a building management system (BMS) with an edge system is shown, according to various exemplary embodiments. The edge system may, in some embodiments, be a software service added to a network of a BMS that can run on one or multiple different nodes of the network. The software service can be made up in terms of components, e.g., integration components, connector components, a building normalization component, software service components, endpoints, etc. The various components can be deployed on various nodes of the network to implement an edge platform that facilitates communication between a cloud or other off-premises platform and the local subsystems of the building. In some embodiments, the edge platform techniques described herein can be implemented for supporting off-premises platforms such as servers, computing clusters, computing systems located in a building other than the edge platform, or any other computing environment.

The nodes of the network could be servers, desktop computers, controllers, virtual machines, etc. In some implementations, the edge system can be deployed on multiple nodes of a network or multiple devices of a BMS with or without interfacing with a cloud or off-premises system. For example, in some implementations, the systems and methods of the present disclosure could be used to coordinate between multiple on-premises devices to perform functions of the BMS partially or wholly without interacting with a cloud or off-premises device (e.g., in a peer-to-peer manner between edge-based devices or in coordination with an on-premises server/gateway).

In some embodiments, the various components of the edge platform can be moved around various nodes of the BMS network as well as the cloud platform. The components may include software services, e.g., control applications, analytics applications, machine learning models, artificial intelligence systems, user interface applications, etc. The software services may have requirements, e.g., a requirement that another software service be present or be in communication with the software service, a particular level of processing resource availability, a particular level of storage availability, etc. In some embodiments, the services of the edge platform can be moved around the nodes of the network based on available data, processing hardware, memory devices, etc. of the nodes. The various software services can be dynamically relocated around the nodes of the network based on the requirements for each software service. In some embodiments, an orchestrator run in a cloud platform, orchestrators distributed across the nodes of the network, and/or the software service itself can make determinations to dynamically relocate the software service around the nodes of the network and/or the cloud platform.

In some embodiments, the edge system can implement plug and play capabilities for connecting devices of a building and connecting the devices to the cloud platform. In some embodiments, the components of the edge system can automatically configure the connection for a new device. For example, when a new device is connected to the edge platform, a tagging and/or recognition process can be performed. This tagging and recognition could be performed in a first building. The result of the tagging and/or recognition may be a configuration indicating how the new device or subsystem should be connected, e.g., point mappings, point lists, communication protocols, necessary integrations, etc. The tagging and/or discovery can, in some embodiments, be performed in a cloud platform and/or twin platform, e.g., based on a digital twin. The resulting configuration can be distributed to every node of the edge system, e.g., to a building normalization component. In some embodiments, the configuration can be stored in a single system, e.g., the cloud platform, and the building normalization component can retrieve the configuration from the cloud platform.

When another device of the same type is installed in the building or another building, a building normalization component can store an indication of the configuration and/or retrieve the indication of the configuration from the cloud platform. The building normalization component can facilitate plug and play by loading and/or implementing the configuration for the device without requiring a tagging and/or discover process. This can allow for the device to be installed and run without requiring any significant amount of setup.

In some embodiments, the building normalization component of one node may discover a device connected to the node. Responsive to detecting the new device, the building normalization component may search a device library and/or registry stored in the normalization component (or on another system) to identify a configuration for the new device. If the new device configuration is not present, the normalization component may send a broadcast to other nodes. For example, the broadcast could indicate an air handling unit (AHU) of a particular type, for a particular vendor, with particular points, etc. Other nodes could respond to the broadcast message with a configuration for the AHU. In some embodiments, a cloud platform could unify configurations for devices of multiple building sites and thus a configuration discovered at one building site could be used at another building site through the cloud platform. In some embodiments, the configurations for different devices could be stored in a digital twin. The digital twin could be used to perform auto configuration, in some embodiments.

In some embodiments, a digital twin of a building could be analyzed to identify how to configure a new device when the new device is connected to an edge device. For example, the digital twin could indicate the various points, communication protocols, functions, etc. of a device type of the new device (e.g., another instance of the device type). Based on the indication of the digital twin, a particular configuration for the new device could be deployed to the edge device that facilitates communication for the new device.

Building Data Platform

Referring now to FIG. 1, a building data platform 100 including an edge platform 102, a cloud platform 106, and a twin manager 108 are shown, according to an exemplary embodiment. The edge platform 102, the cloud platform 106, and the twin manager 108 can each be separate services deployed on the same or different computing systems. In some embodiments, the cloud platform 106 and the twin manager 108 are implemented in off premises computing systems, e.g., outside a building. The edge platform 102 can be implemented on-premises, e.g., within the building. However, any combination of on-premises and off-premises components of the building data platform 100 can be implemented.

The building data platform 100 includes applications 110. The applications 110 can be various applications that operate to manage the building subsystems 122. The applications 110 can be remote or on-premises applications (or a hybrid of both) that run on various computing systems. The applications 110 can include an alarm application 168 configured to manage alarms for the building subsystems 122. The applications 110 include an assurance application 170 that implements assurance services for the building subsystems 122. In some embodiments, the applications 110 include an energy application 172 configured to manage the energy usage of the building subsystems 122. The applications 110 include a security application 174 configured to manage security systems of the building.

In some embodiments, the applications 110 and/or the cloud platform 106 interacts with a user device 176. In some embodiments, a component or an entire application of the applications 110 runs on the user device 176. The user device 176 may be a laptop computer, a desktop computer, a smartphone, a tablet, and/or any other device with an input interface (e.g., touch screen, mouse, keyboard, etc.) and an output interface (e.g., a speaker, a display, etc.).

The applications 110, the twin manager 108, the cloud platform 106, and the edge platform 102 can be implemented on one or more computing systems, e.g., on processors and/or memory devices. For example, the edge platform 102 includes processor(s) 118 and memories 120, the cloud platform 106 includes processor(s) 124 and memories 126, the applications 110 include processor(s) 164 and memories 166, and the twin manager 108 includes processor(s) 148 and memories 150.

The processors can be a general purpose or specific purpose processors, an application specific integrated circuit (ASIC), one or more field programmable gate arrays (FPGAs), a group of processing components, or other suitable processing components. The processors may be configured to execute computer code and/or instructions stored in the memories or received from other computer readable media (e.g., CDROM, network storage, a remote server, etc.).

The memories can include one or more devices (e.g., memory units, memory devices, storage devices, etc.) for storing data and/or computer code for completing and/or facilitating the various processes described in the present disclosure. The memories can include random access memory (RAM), read-only memory (ROM), hard drive storage, temporary storage, non-volatile memory, flash memory, optical memory, or any other suitable memory for storing software objects and/or computer instructions. The memories can include database components, object code components, script components, or any other type of information structure for supporting the various activities and information structures described in the present disclosure. The memories can be communicably connected to the processors and can include computer code for executing (e.g., by the processors) one or more processes described herein.

The edge platform 102 can be configured to provide connection to the building subsystems 122. The edge platform 102 can receive messages from the building subsystems 122 and/or deliver messages to the building subsystems 122. The edge platform 102 includes one or multiple gateways, e.g., the gateways 112-116. The gateways 112-116 can act as a gateway between the cloud platform 106 and the building subsystems 122. The gateways 112-116 can be the gateways described in U.S. Provisional Patent Application No. 62/951,897 filed Dec. 20, 2019, the entirety of which is incorporated by reference herein. In some embodiments, the applications 110 can be deployed on the edge platform 102. In this regard, lower latency in management of the building subsystems 122 can be realized.

The edge platform 102 can be connected to the cloud platform 106 via a network 104. The network 104 can communicatively couple the devices and systems of building data platform 100. In some embodiments, the network 104 is at least one of and/or a combination of a Wi-Fi network, a wired Ethernet network, a ZigBee network, a Bluetooth network, and/or any other wireless network. The network 104 may be a local area network or a wide area network (e.g., the Internet, a building WAN, etc.) and may use a variety of communications protocols (e.g., BACnet, IP, LON, etc.). The network 104 may include routers, modems, servers, cell towers, satellites, and/or network switches. The network 104 may be a combination of wired and wireless networks.

The cloud platform 106 can be configured to facilitate communication and routing of messages between the applications 110, the twin manager 108, the edge platform 102, and/or any other system. The cloud platform 106 can include a platform manager 128, a messaging manager 140, a command processor 136, and an enrichment manager 138. In some embodiments, the cloud platform 106 can facilitate messaging between the building data platform 100 via the network 104.

The messaging manager 140 can be configured to operate as a transport service that controls communication with the building subsystems 122 and/or any other system, e.g., managing commands to devices (C2D), commands to connectors (C2C) for external systems, commands from the device to the cloud (D2C), and/or notifications. The messaging manager 140 can receive different types of data from the applications 110, the twin manager 108, and/or the edge platform 102. The messaging manager 140 can receive change on value data 142, e.g., data that indicates that a value of a point has changed. The messaging manager 140 can receive timeseries data 144, e.g., a time correlated series of data entries each associated with a particular time stamp. Furthermore, the messaging manager 140 can receive command data 146. All of the messages handled by the cloud platform 106 can be handled as an event, e.g., the data 142-146 can each be packaged as an event with a data value occurring at a particular time (e.g., a temperature measurement made at a particular time).

The cloud platform 106 includes a command processor 136. The command processor 136 can be configured to receive commands to perform an action from the applications 110, the building subsystems 122, the user device 176, etc. The command processor 136 can manage the commands, determine whether the commanding system is authorized to perform the particular commands, and communicate the commands to the commanded system, e.g., the building subsystems 122 and/or the applications 110. The commands could be a command to change an operational setting that control environmental conditions of a building, a command to run analytics, etc.

The cloud platform 106 includes an enrichment manager 138. The enrichment manager 138 can be configured to enrich the events received by the messaging manager 140. The enrichment manager 138 can be configured to add contextual information to the events. The enrichment manager 138 can communicate with the twin manager 108 to retrieve the contextual information. In some embodiments, the contextual information is an indication of information related to the event. For example, if the event is a timeseries temperature measurement of a thermostat, contextual information such as the location of the thermostat (e.g., what room), the equipment controlled by the thermostat (e.g., what VAV), etc. can be added to the event. In this regard, when a consuming application, e.g., one of the applications 110 receives the event, the consuming application can operate based on the data of the event, the temperature measurement, and also the contextual information of the event.

The enrichment manager 138 can solve a problem that when a device produces a significant amount of information, the information may contain simple data without context. An example might include the data generated when a user scans a badge at a badge scanner of the building subsystems 122. This physical event can generate an output event including such information as "DeviceBadgeScannerID," "BadgeID," and/or "Date/Time." However, if a system sends this data to a consuming application, e.g., Consumer A and a Consumer B, each customer may need to call the building data platform knowledge service to query information with queries such as, "What space, build, floor is that badge scanner in?" or "What user is associated with that badge?"

By performing enrichment on the data feed, a system can be able to perform inferences on the data. A result of the enrichment may be transformation of the message "DeviceBadgeScannerId, BadgeId, Date/Time," to "Region, Building, Floor, Asset, DeviceId, BadgeId, UserName, EmployeeId, Date/Time Scanned." This can be a significant optimization, as a system can reduce the number of calls by 1/n, where n is the number of consumers of this data feed.

By using this enrichment, a system can also have the ability to filter out undesired events. If there are 100 building in a campus that receive 100,000 events per building each hour, but only 1 building is actually commissioned, only ¹⁄₁₀ of the events are enriched. By looking at what events are enriched and what events are not enriched, a system can do traffic shaping of forwarding of these events to reduce the cost of forwarding events that no consuming application wants or reads.

An example of an event received by the enrichment manager 138 may be:

{
"id": "someguid",
"eventType": "Device_Heartbeat",
"eventTime": "2018-01-27T00:00:00+00:00"
"eventValue": 1,
"deviceID": "someguid"
}

An example of an enriched event generated by the enrichment manager 138 may be:

{
"id": "someguid",
"eventType": "Device_Heartbeat",
"eventTime": "2018-01-27T00:00:00+00:00"
"eventValue": 1,
"deviceID": "someguid",
"buildingName": "Building-48",
"buildingID": "SomeGuid",
"panelID": "SomeGuid",
"panelName": "Building-48-Panel-13",
"cityID": 371,
"cityName": "Milwaukee",
"stateID": 48,
"stateName": "Wisconsin (WI)",
"countryID": 1,
"countryName": "United States"
}

By receiving enriched events, an application of the applications 110 can be able to populate and/or filter what events are associated with what areas. Furthermore, user interface generating applications can generate user interfaces that include the contextual information based on the enriched events.

The cloud platform 106 includes a platform manager 128. The platform manager 128 can be configured to manage the users and/or subscriptions of the cloud platform 106. For example, what subscribing building, user, and/or tenant utilizes the cloud platform 106. The platform manager 128 includes a provisioning service 130 configured to provision the cloud platform 106, the edge platform 102, and the twin manager 108. The platform manager 128 includes a subscription service 132 configured to manage a subscription of the building, user, and/or tenant while the entitlement service 134 can track entitlements of the buildings, users, and/or tenants.

The twin manager 108 can be configured to manage and maintain a digital twin. The digital twin can be a digital representation of the physical environment, e.g., a building. The twin manager 108 can include a change feed generator 152, a schema and ontology 154, a projection manager 156, a policy manager 158, an entity, relationship, and event database 160, and a graph projection database 162.

The graph projection manager 156 can be configured to construct graph projections and store the graph projections in the graph projection database 162. Entities, relationships, and events can be stored in the database 160. The graph projection manager 156 can retrieve entities, relationships, and/or events from the database 160 and construct a graph projection based on the retrieved entities, relationships and/or events. In some embodiments, the database 160 includes an entity-relationship collection for multiple subscriptions.

In some embodiment, the graph projection manager 156 generates a graph projection for a particular user, application, subscription, and/or system. In this regard, the graph projection can be generated based on policies for the particular user, application, and/or system in addition to an ontology specific for that user, application, and/or system. In this regard, an entity could request a graph projection and the graph projection manager 156 can be configured to generate the graph projection for the entity based on policies and an ontology specific to the entity. The policies can indicate what entities, relationships, and/or events the entity has access to. The ontology can indicate what types of relationships between entities the requesting entity expects to see, e.g., floors within a building, devices within a floor, etc. Another requesting entity may have an ontology to see devices within a building and applications for the devices within the graph.

The graph projections generated by the graph projection manager 156 and stored in the graph projection database 162 can be a knowledge graph and is an integration point. For example, the graph projections can represent floor plans and systems associated with each floor. Furthermore, the graph projections can include events, e.g., telemetry data of the building subsystems 122. The graph projections can show application services as nodes and API calls between the services as edges in the graph. The graph projections can illustrate the capabilities of spaces, users, and/or devices. The graph projections can include indications of the building subsystems 122, e.g., thermostats, cameras, VAVs, etc. The graph projection database 162 can store graph projections that keep up a current state of a building.

The graph projections of the graph projection database 162 can be digital twins of a building. Digital twins can be digital replicas of physical entities that enable an in-depth analysis of data of the physical entities and provide the potential to monitor systems to mitigate risks, manage issues, and utilize simulations to test future solutions. Digital twins can play an important role in helping technicians find the root cause of issues and solve problems faster, in supporting safety and security protocols, and in supporting building managers in more efficient use of energy and other facilities resources. Digital twins can be used to enable and unify security systems, employee experience, facilities management, sustainability, etc.

In some embodiments the enrichment manager 138 can use a graph projection of the graph projection database 162 to enrich events. In some embodiments, the enrichment manager 138 can identify nodes and relationships that are associated with, and are pertinent to, the device that generated the event. For example, the enrichment manager 138 could identify a thermostat generating a temperature measurement event within the graph. The enrichment manager 138 can identify relationships between the thermostat and spaces, e.g., a zone that the thermostat is located in. The enrichment manager 138 can add an indication of the zone to the event.

Furthermore, the command processor 136 can be configured to utilize the graph projections to command the building subsystems 122. The command processor 136 can identify a policy for a commanding entity within the graph projection to determine whether the commanding entity has the ability to make the command. For example, the command processor 136, before allowing a user to make a command, determine, based on the graph projection database 162, to determine that the user has a policy to be able to make the command.

In some embodiments, the policies can be conditional based policies. For example, the building data platform 100 can apply one or more conditional rules to determine whether a particular system has the ability to perform an action. In some embodiments, the rules analyze a behavioral based biometric. For example, a behavioral based biometric can indicate normal behavior and/or normal behavior rules for a system. In some embodiments, when the building data platform 100 determines, based on the one or more conditional rules, that an action requested by a system does not match a normal behavior, the building data platform 100 can deny the system the ability to perform the action and/or request approval from a higher level system.

For example, a behavior rule could indicate that a user has access to log into a system with a particular IP address between 8 A.M. through 5 P.M. However, if the user logs in to the system at 7 P.M., the building data platform 100 may contact an administrator to determine whether to give the user permission to log in.

The change feed generator 152 can be configured to generate a feed of events that indicate changes to the digital twin, e.g., to the graph. The change feed generator 152 can track changes to the entities, relationships, and/or events of the graph. For example, the change feed generator 152 can detect an addition, deletion, and/or modification of a node or edge of the graph, e.g., changing the entities, relationships, and/or events within the database 160. In response to detecting a change to the graph, the change feed generator 152 can generate an event summarizing the change. The event can indicate what nodes and/or edges have changed and how the nodes and edges have changed. The events can be posted to a topic by the change feed generator 152.

The change feed generator 152 can implement a change feed of a knowledge graph. The building data platform 100 can implement a subscription to changes in the knowledge graph. When the change feed generator 152 posts events in the change feed, subscribing systems or applications can receive the change feed event. By generating a record of all changes that have happened, a system can stage data in different ways, and then replay the data back in whatever order the system wishes. This can include running the changes sequentially one by one and/or by jumping from one major change to the next. For example, to generate a graph at a particular time, all change feed events up to the particular time can be used to construct the graph.

The change feed can track the changes in each node in the graph and the relationships related to them, in some embodiments. If a user wants to subscribe to these changes and the user has proper access, the user can simply submit a web API call to have sequential notifications of each change that happens in the graph. A user and/or system can replay the changes one by one to reinstitute the graph at any given time slice. Even though the messages are "thin" and only include notification of change and the reference "id/seq id," the change feed can keep a copy of every state of each node and/or relationship so that a user and/or system can retrieve those past states at any time for each node. Furthermore, a consumer of the change feed could also create dynamic "views" allowing different "snapshots" in time of what the graph looks like from a particular context. While the twin manager 108 may contain the history and the current state of the graph based upon schema evaluation, a consumer can retain a copy of that data, and thereby create dynamic views using the change feed.

The schema and ontology 154 can define the message schema and graph ontology of the twin manager 108. The message schema can define what format messages received by the messaging manager 140 should have, e.g., what parameters, what formats, etc. The ontology can define graph projections, e.g., the ontology that a user wishes to view. For example, various systems, applications, and/or users can be associated with a graph ontology. Accordingly, when the graph projection manager 156 generates an graph projection for a user, system, or subscription, the graph projection manager 156 can generate a graph projection according to the ontology specific to the user. For example, the ontology can define what types of entities are related in what order in a graph, for example, for the ontology for a subscription of "Customer A," the graph projection manager 156 can create relationships for a graph projection based on the rule:

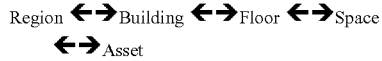

For the ontology of a subscription of "Customer B," the graph projection manager 156 can create relationships based on the rule:

The policy manager 158 can be configured to respond to requests from other applications and/or systems for policies. The policy manager 158 can consult a graph projection to determine what permissions different applications, users, and/or devices have. The graph projection can indicate various permissions that different types of entities have and the policy manager 158 can search the graph projection to identify the permissions of a particular entity. The policy manager 158 can facilitate fine grain access control with user permissions. The policy manager 158 can apply permissions across a graph, e.g., if "user can view all data associated with floor 1" then they see all subsystem data for that floor, e.g., surveillance cameras, HVAC devices, fire detection and response devices, etc.

The twin manager 108 includes a query manager 165 and a twin function manager 167. The query manger 164 can be configured to handle queries received from a requesting system, e.g., the user device 176, the applications 110, and/or any other system. The query manager 165 can receive queries that include query parameters and context. The query manager 165 can query the graph projection database 162 with the query parameters to retrieve a result. The query manager 165 can then cause an event processor, e.g., a twin function, to operate based on the result and the context. In some embodiments, the query manager 165 can select the twin function based on the context and/or perform operates based on the context.

The twin function manager 167 can be configured to manage the execution of twin functions. The twin function manager 167 can receive an indication of a context query that identifies a particular data element and/or pattern in the graph projection database 162. Responsive to the particular data element and/or pattern occurring in the graph projection database 162 (e.g., based on a new data event added to the graph projection database 162 and/or change to nodes or edges of the graph projection database 162, the twin function manager 167 can cause a particular twin function to execute. The twin function can execute based on an event, context, and/or rules. The event can be data that the twin function executes against. The context can be information that provides a contextual description of the data, e.g., what device the event is associated with, what control point should be updated based on the event, etc. The twin function manager 167 can be configured to perform the operations of the FIGS. 11-15.

Figure 2:
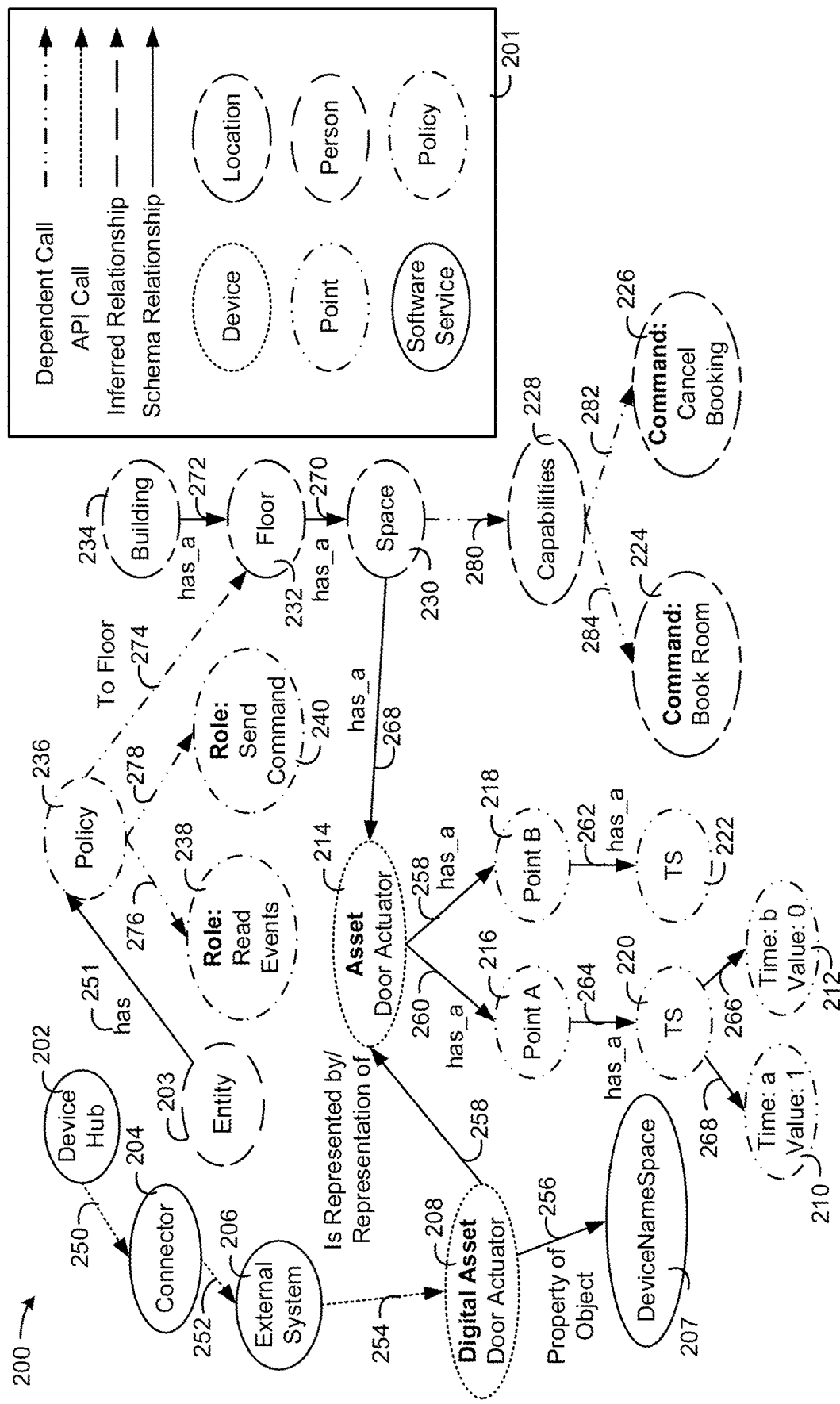
FIG. 2 is a graph projection of the twin manager of FIG. 1 including application programming interface (API) data, capability data, policy data, and services, according to an exemplary embodiment.

Referring now to FIG. 2, a graph projection 200 of the twin manager 108 including application programming interface (API) data, capability data, policy data, and services is shown, according to an exemplary embodiment. The graph projection 200 includes nodes 202-240 and edges 250-272. The nodes 202-240 and the edges 250-272 are defined according to the key 201. The nodes 202-240 represent different types of entities, devices, locations, points, persons, policies, and software services (e.g., API services). The edges 250-272 represent relationships between the nodes 202-240, e.g., dependent calls, API calls, inferred relationships, and schema relationships (e.g., BRICK relationships).

The graph projection 200 includes a device hub 202 which may represent a software service that facilitates the communication of data and commands between the cloud platform 106 and a device of the building subsystems 122, e.g., door actuator 214. The device hub 202 is related to a connector 204, an external system 206, and a digital asset "Door Actuator" 208 by edge 250, edge 252, and edge 254.

The cloud platform 106 can be configured to identify the device hub 202, the connector 204, the external system 206 related to the door actuator 214 by searching the graph projection 200 and identifying the edges 250-254 and edge 258. The graph projection 200 includes a digital representation of the "Door Actuator," node 208. The digital asset "Door Actuator" 208 includes a "DeviceNameSpace" represented by node 207 and related to the digital asset "Door Actuator" 208 by the "Property of Object" edge 256.

The "Door Actuator" 214 has points and timeseries. The "Door Actuator" 214 is related to "Point A" 216 by a "has_a" edge 260. The "Door Actuator" 214 is related to "Point B" 218 by a "has_A" edge 258. Furthermore, timeseries associated with the points A and B are represented by nodes "TS" 220 and "TS" 222. The timeseries are related to the points A and B by "has_a" edge 264 and "has_a" edge 262. The timeseries "TS" 220 has particular samples, sample 210 and 212 each related to "TS" 220 with edges 268 and 266 respectively. Each sample includes a time and a value. Each sample may be an event received from the door actuator that the cloud platform 106 ingests into the entity, relationship, and event database 160, e.g., ingests into the graph projection 200.

The graph projection 200 includes a building 234 representing a physical building. The building includes a floor represented by floor 232 related to the building 234 by the "has_a" edge from the building 234 to the floor 232. The floor has a space indicated by the edge "has_a" 270 between the floor 232 and the space 230. The space has particular capabilities, e.g., is a room that can be booked for a meeting, conference, private study time, etc. Furthermore, the booking can be canceled. The capabilities for the floor 232 are represented by capabilities 228 related to space 230 by edge 280. The capabilities 228 are related to two different commands, command "book room" 224 and command "cancel booking" 226 related to capabilities 228 by edge 284 and edge 282 respectively.

If the cloud platform 106 receives a command to book the space represented by the node, space 230, the cloud platform 106 can search the graph projection 200 for the capabilities for the 228 related to the space 230 to determine whether the cloud platform 106 can book the room.

In some embodiments, the cloud platform 106 could receive a request to book a room in a particular building, e.g., the building 234. The cloud platform 106 could search the graph projection 200 to identify spaces that have the capabilities to be booked, e.g., identify the space 230 based on the capabilities 228 related to the space 230. The cloud platform 106 can reply to the request with an indication of the space and allow the requesting entity to book the space 230.

The graph projection 200 includes a policy 236 for the floor 232. The policy 236 is related set for the floor 232 based on a "To Floor" edge 274 between the policy 236 and the floor 232. The policy 236 is related to different roles for the floor 232, read events 238 via edge 276 and send command 240 via edge 278. The policy 236 is set for the entity 203 based on has edge 251 between the entity 203 and the policy 236.

The twin manager 108 can identify policies for particular entities, e.g., users, software applications, systems, devices, etc. based on the policy 236. For example, if the cloud platform 106 receives a command to book the space 230. The cloud platform 106 can communicate with the twin manager 108 to verify that the entity requesting to book the space 230 has a policy to book the space. The twin manager 108 can identify the entity requesting to book the space as the entity 203 by searching the graph projection 200. Furthermore, the twin manager 108 can further identify the edge has 251 between the entity 203 and the policy 236 and the edge 1178 between the policy 236 and the command 240.

Furthermore, the twin manager 108 can identify that the entity 203 has the ability to command the space 230 based on the edge 1174 between the policy 236 and the edge 270 between the floor 232 and the space 230. In response to identifying the entity 203 has the ability to book the space 230, the twin manager 108 can provide an indication to the cloud platform 106.

Furthermore, if the entity makes a request to read events for the space 230, e.g., the sample 210 and the sample 212, the twin manager 108 can identify the edge has 251 between the entity 203 and the policy 236, the edge 1178 between the policy 236 and the read events 238, the edge 1174 between the policy 236 and the floor 232, the "has_a" edge 270 between the floor 232 and the space 230, the edge 268 between the space 230 and the door actuator 214, the edge 260 between the door actuator 214 and the point A 216, the "has_a" edge 264 between the point A 216 and the TS 220, and the edges 268 and 266 between the TS 220 and the samples 210 and 212 respectively.

Figure 3:
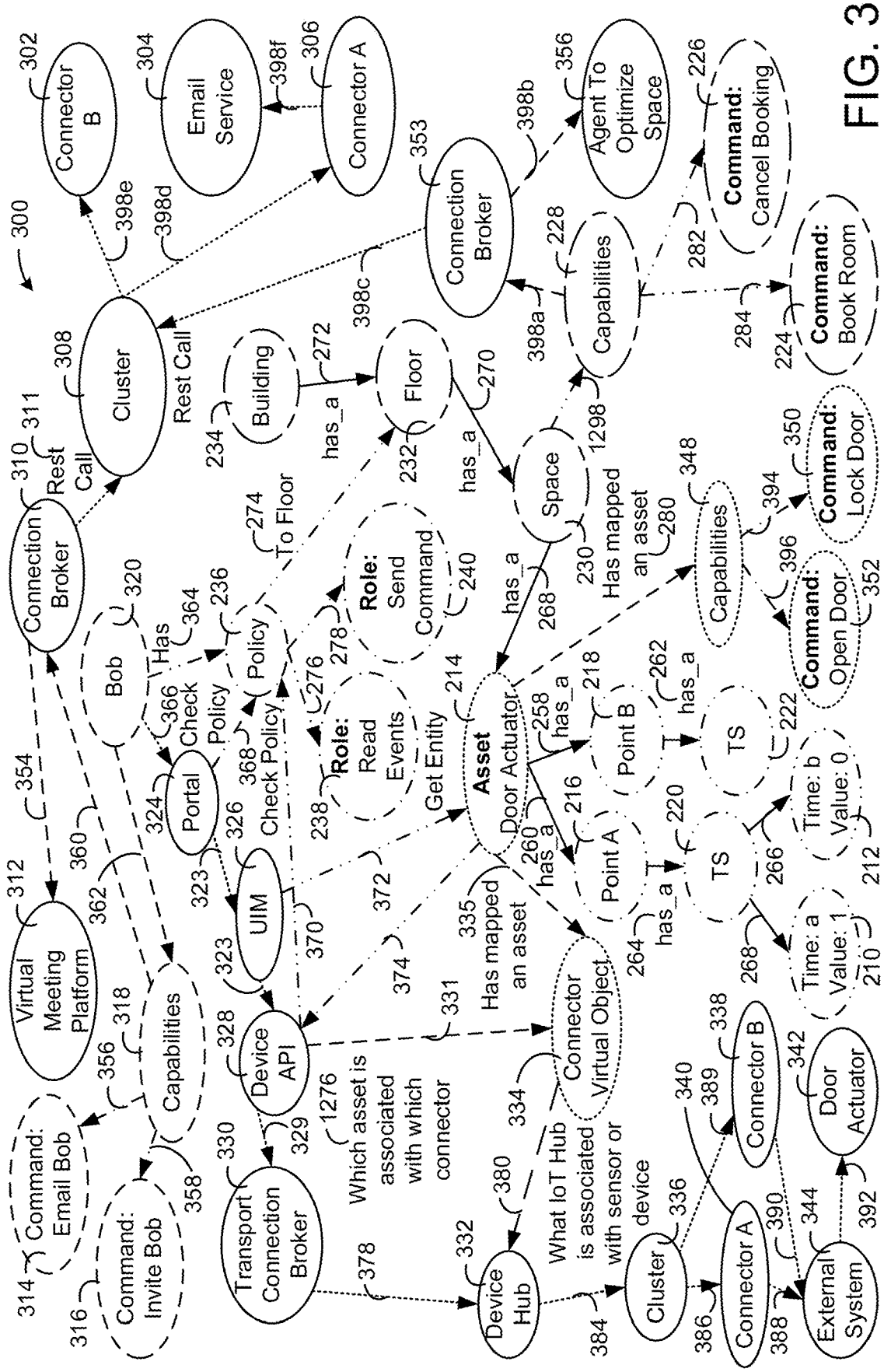
FIG. 3 is another graph projection of the twin manager of FIG. 1 including application programming interface (API) data, capability data, policy data, and services, according to an exemplary embodiment.

Referring now to FIG. 3, a graph projection 300 of the twin manager 108 including application programming interface (API) data, capability data, policy data, and services is shown, according to an exemplary embodiment. The graph projection 300 includes the nodes and edges described in the graph projection 200 of FIG. 2. The graph projection 300 includes a connection broker 1254 related to capabilities 228 by edge 398a. The connection broker 353 can be a node representing a software application configured to facilitate a connection with another software application. In some embodiments, the cloud platform 106 can identify the system that implements the capabilities 228 by identifying the edge 398a between the capabilities 228 and the connection broker 353.

The connection broker 353 is related to an agent that optimizes a space 356 via edge 398b. The agent represented by the node 356 can book and cancel bookings for the space represented by the node 230 based on the edge 398b between the connection broker 353 and the node 356 and the edge 398a between the capabilities 228 and the connection broker 353.

The connection broker 353 is related to a cluster 308 by edge 398c. Cluster 308 is related to connector B 302 via edge 398e and connector A 306 via edge 398d. The connector A 306 is related to an external subscription service 304. A connection broker 310 is related to cluster 308 via an edge 311 representing a rest call that the connection broker represented by node 310 can make to the cluster represented by cluster 308.

The connection broker 310 is related to a virtual meeting platform 312 by an edge 354. The node 312 represents an external system that represents a virtual meeting platform. The connection broker represented by node 310 can represent a software component that facilitates a connection between the cloud platform 106 and the virtual meeting platform represented by node 312. When the cloud platform 106 needs to communicate with the virtual meeting platform represented by the node 312, the cloud platform 106 can identify the edge 354 between the connection broker 310 and the virtual meeting platform 312 and select the connection broker represented by the node 310 to facilitate communication with the virtual meeting platform represented by the node 312.

A capabilities node 318 can be connected to the connection broker 310 via edge 360. The capabilities 318 can be capabilities of the virtual meeting platform represented by the node 312 and can be related to the node 312 through the edge 360 to the connection broker 310 and the edge 354 between the connection broker 310 and the node 312. The capabilities 318 can define capabilities of the virtual meeting platform represented by the node 312. The node 320 is related to capabilities 318 via edge 362. The capabilities may be an invite bob command represented by node 316 and an email bob command represented by node 314. The capabilities 318 can be linked to a node 320 representing a user, Bob. The cloud platform 106 can facilitate email commands to send emails to the user Bob via the email service represented by the node 304. The node 304 is related to the connect a node 306 via edge 398f. Furthermore, the cloud platform 106 can facilitate sending an invite for a virtual meeting via the virtual meeting platform represented by the node 312 linked to the node 318 via the edge 358.

The node 320 for the user Bob can be associated with the policy 236 via the "has" edge 364. Furthermore, the node 320 can have a "check policy" edge 366 with a portal node 324. The device API node 328 has a check policy edge 370 to the policy node 236. The portal node 324 has an edge 368 to the policy node 236. The portal node 324 has an edge 323 to a node 326 representing a user input manager (UIM). The portal node 324 is related to the UIM node 326 via an edge 323. The UIM node 326 has an edge 323 to a device API node 328. The UIM node 326 is related to the door actuator node 214 via edge 372. The door actuator node 214 has an edge 374 to the device API node 328. The door actuator 214 has an edge 335 to the connector virtual object 334. The device hub 332 is related to the connector virtual object via edge 380. The device API node 328 can be an API for the door actuator 214. The connector virtual object 334 is related to the device API node 328 via the edge 331.

The device API node 328 is related to a transport connection broker 330 via an edge 329. The transport connection broker 330 is related to a device hub 332 via an edge 378. The device hub represented by node 332 can be a software component that hands the communication of data and commands for the door actuator 214. The cloud platform 106 can identify where to store data within the graph projection 300 received from the door actuator by identifying the nodes and edges between the points 216 and 218 and the device hub node 332. Similarly, the cloud platform 308 can identify commands for the door actuator that can be facilitated by the device hub represented by the node 332, e.g., by identifying edges between the device hub node 332 and an open door node 352 and an lock door node 350. The door actuator 114 has an edge "has mapped an asset" 280 between the node 214 and a capabilities node 348. The capabilities node 348 and the nodes 352 and 350 are linked by edges 396 and 394.

The device hub 332 is linked to a cluster 336 via an edge 384. The cluster 336 is linked to connector A 340 and connector B 338 by edges 386 and the edge 389. The connector A 340 and the connector B 338 is linked to an external system 344 via edges 388 and 390. The external system 344 is linked to a door actuator 342 via an edge 392.

Figure 4:
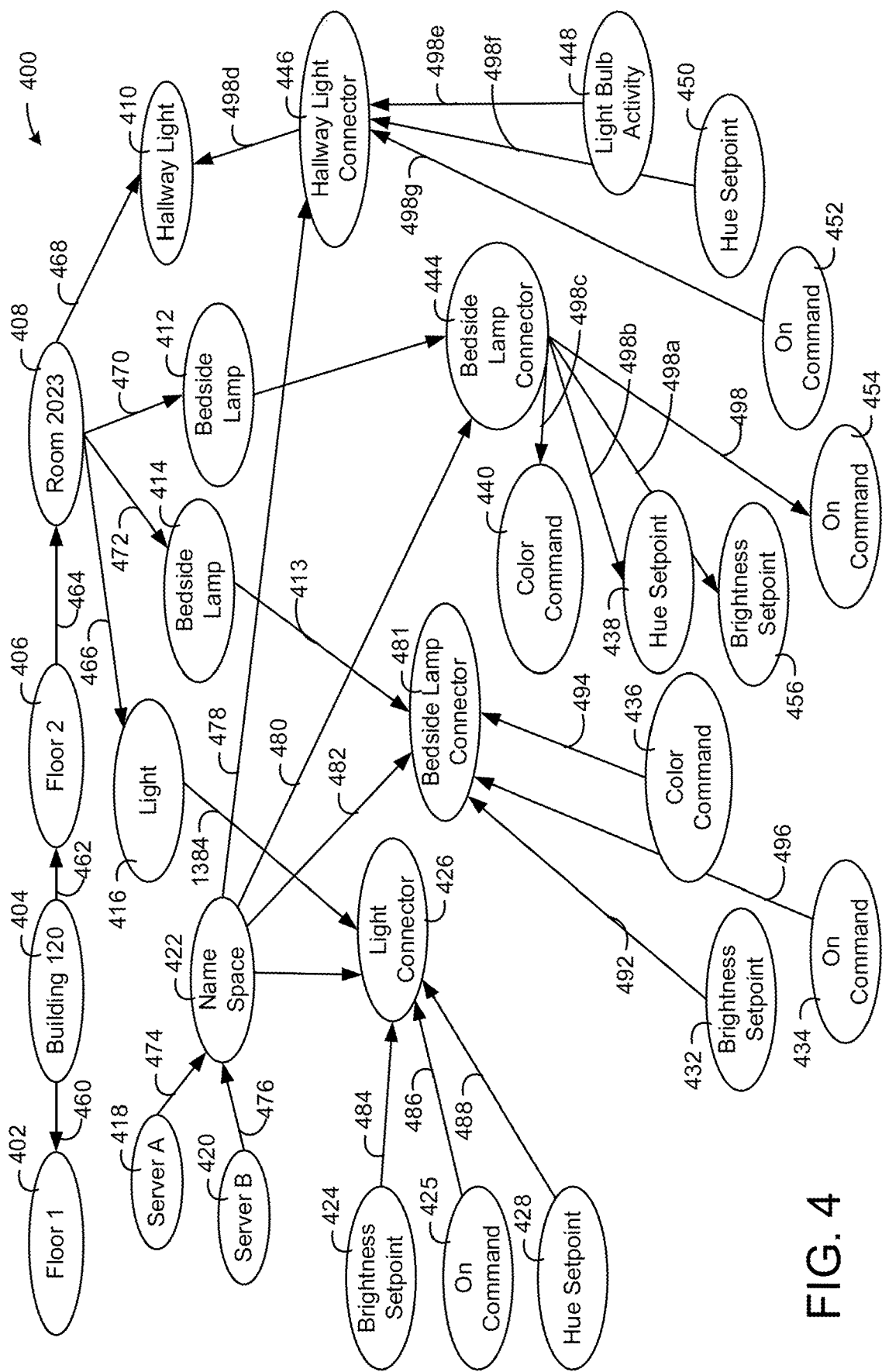
FIG. 4 is a graph projection of the twin manager of FIG. 1 including equipment and capability data for the equipment, according to an exemplary embodiment.

Referring now to FIG. 4, a graph projection 400 of the twin manager 108 including equipment and capability data for the equipment is shown, according to an exemplary embodiment. The graph projection 400 includes nodes 402-456 and edges 360-498f The cloud platform 106 can search the graph projection 400 to identify capabilities of different pieces of equipment.

A building node 404 represents a particular building that includes two floors. A floor 1 node 402 is linked to the building node 404 via edge 460 while a floor 2 node 406 is linked to the building node 404 via edge 462. The floor 2 includes a particular room 2023 represented by edge 464 between floor 2 node 406 and room 2023 node 408. Various pieces of equipment are included within the room 2023. A light represented by light node 416, a bedside lamp node 414, a bedside lamp node 412, and a hallway light node 410 are related to room 2023 node 408 via edge 466, edge 472, edge 470, and edge 468.

The light represented by light node 416 is related to a light connector 426 via edge 484. The light connector 426 is related to multiple commands for the light represented by the light node 416 via edges 484, 486, and 488. The commands may be a brightness setpoint 424, an on command 425, and a hue setpoint 428. The cloud platform 106 can receive a request to identify commands for the light represented by the light 416 and can identify the nodes 424-428 and provide an indication of the commands represented by the node 424-428 to the requesting entity. The requesting entity can then send commands for the commands represented by the nodes 424-428.

The bedside lamp node 414 is linked to a bedside lamp connector 481 via an edge 413. The connector 481 is related to commands for the bedside lamp represented by the bedside lamp node 414 via edges 492, 496, and 494. The command nodes are a brightness setpoint node 432, an on command node 434, and a color command 436. The hallway light 410 is related to a hallway light connector 446 via an edge 498d. The hallway light connector 446 is linked to multiple commands for the hallway light node 410 via edges 498g, 498f, and 498e. The commands are represented by an on command node 452, a hue setpoint node 450, and a light bulb activity node 448.

The graph projection 400 includes a name space node 422 related to a server A node 418 and a server B node 420 via edges 474 and 476. The name space node 422 is related to the bedside lamp connector 481, the bedside lamp connector 444, and the hallway light connector 446 via edges 482, 480, and 478. The bedside lamp connector 444 is related to commands, e.g., the color command node 440, the hue setpoint command 438, a brightness setpoint command 456, and an on command 454 via edges 498c, 498b, 498a, and 498.

Edge Platform

Figure 5:
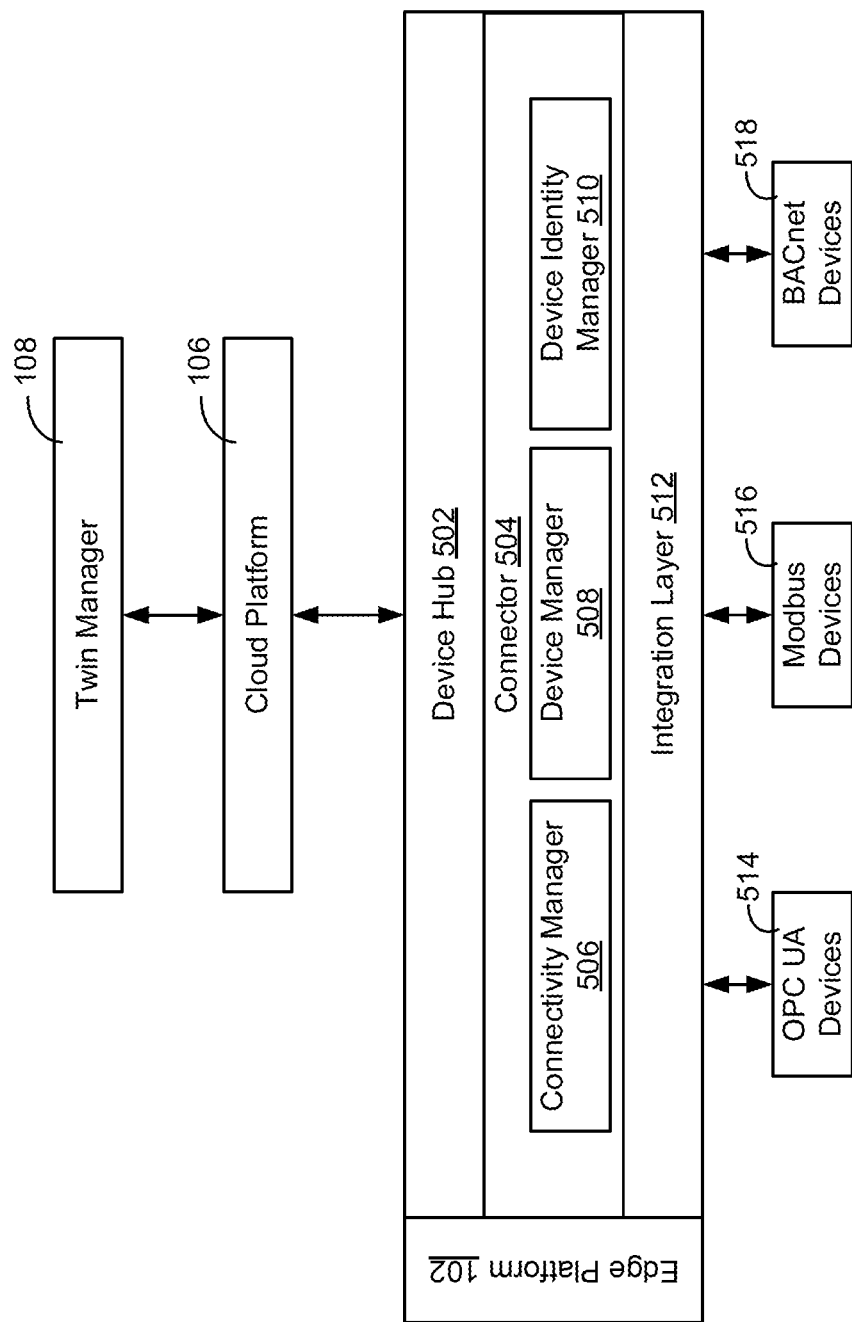
FIG. 5 is a block diagram of the edge platform of FIG. 1 shown in greater detail to include a connectivity manager, a device manager, and a device identity manager, according to an exemplary embodiment.

Referring now to FIG. 5, the edge platform 102 is shown in greater detail to include a connectivity manager 506, a device manager 508, and a device identity manager 510, according to an exemplary embodiment. In some embodiments, the edge platform 102 of FIG. 5 may be a particular instance run on a computing device. For example, the edge platform 102 could be instantiated one or multiple times on various computing devices of a building, a cloud, etc. In some embodiments, each instance of the edge platform 102 may include the connectivity manager 506, the device manager 508, and/or the device identity manager 510. These three components may serve as the core of the edge platform 102.

The edge platform 102 can include a device hub 502, a connector 504, and/or an integration layer 512. The edge platform 102 can facilitate communication between the devices 514-518 and the cloud platform 106 and/or twin manager 108. The communication can be telemetry, commands, control data, etc. Examples of command and control via a building data platform is described in U.S. patent application Ser. No. 17/134,661 filed Dec. 28, 2020, the entirety of which is incorporated by reference herein.

The devices 514-518 can be building devices that communicate with the edge platform 102 via a variety of various building protocols. For example, the protocol could be Open Platform Communications (OPC) Unified Architecture (UA), Modbus, BACnet, etc. The integration layer 512 can, in some embodiments, integrate the various devices 514-518 through the respective communication protocols of each of the devices 514-518. In some embodiments, the integration layer 512 can dynamically include various integration components based on the needs of the instance of the edge platform 102, for example, if a BACnet device is connected to the edge platform 102, the edge platform 102 may run a BACnet integration component. The connector 504 may be the core service of the edge platform 102. In some embodiments, every instance of the edge platform 102 can include the connector 504. In some embodiments, the edge platform 102 is a light version of a gateway.

In some embodiments, the connectivity manager 506 operates to connect the devices 514-518 with the cloud platform 106 and/or the twin manager 108. The connectivity manager 506 can allow a device running the connectivity manager 506 to connect with an ecosystem, the cloud platform 106, another device, another device which in turn connects the device to the cloud, connects to a data center, a private on-premises cloud, etc. The connectivity manager 506 can facilitate communication northbound (with higher level networks), southbound (with lower level networks), and/or east/west (e.g., with peer networks). The connectivity manager 506 can implement communication via MQ Telemetry Transport (MQTT) and/or sparkplug, in some embodiments. The operational abilities of the connectivity manager 506 can be extended via an software development toolkit (SDK), and/or an API. In some embodiments, the connectivity manager 506 can handle offline network states with various networks.

In some embodiments, the device manager 508 can be configured to manage updates and/or upgrades for the device that the device manager 508 is run on, the software for the edge platform 102 itself, and/or devices connected to the edge platform 102, e.g., the devices 514-518. The software updates could be new software components, e.g., services, new integrations, etc. The device manager 508 can be used to manage software for edge platforms for a site, e.g., make updates or changes on a large scale across multiple devices. In some embodiments, the device manager 508 can implement an upgrade campaign where one or more certain device types and/or pieces of software are all updated together. The update depth may be of any order, e.g., a single update to a device, an update to a device and a lower level device that the device communication with, etc. In some embodiments, the software updates are delta updates, which are suitable for low-bandwidth devices. For example, instead of replacing an entire piece of software on the edge platform 102, only the portions of the piece of software that need to be updated may be updated, thus reducing the amount of data that needs to be downloaded to the edge platform 102 in order to complete the update.

The device identity manager 510 can implement authorization and authentication for the edge platform 102. For example, when the edge platform 102 connects with the cloud platform 106, the twin manager 108, and/or the devices 514-518, the device identity manager 510 can identify the edge platform 102 to the various platforms, managers, and/or devices. Regardless of the device that the edge platform 102 is implemented on, the device identity manager 510 can handle identification and uniquely identify the edge platform 102. The device identity manager 510 can handle certification management, trust data, authentication, authorization, encryption keys, credentials, signatures, etc. Furthermore, the device identity manager 510 may implement various security features for the edge platform 102, e.g., antivirus software, firewalls, verified private networks (VPNs), etc. Furthermore, the device identity manager 510 can manage commissioning and/or provisioning for the edge platform 102.

Figure 6A:
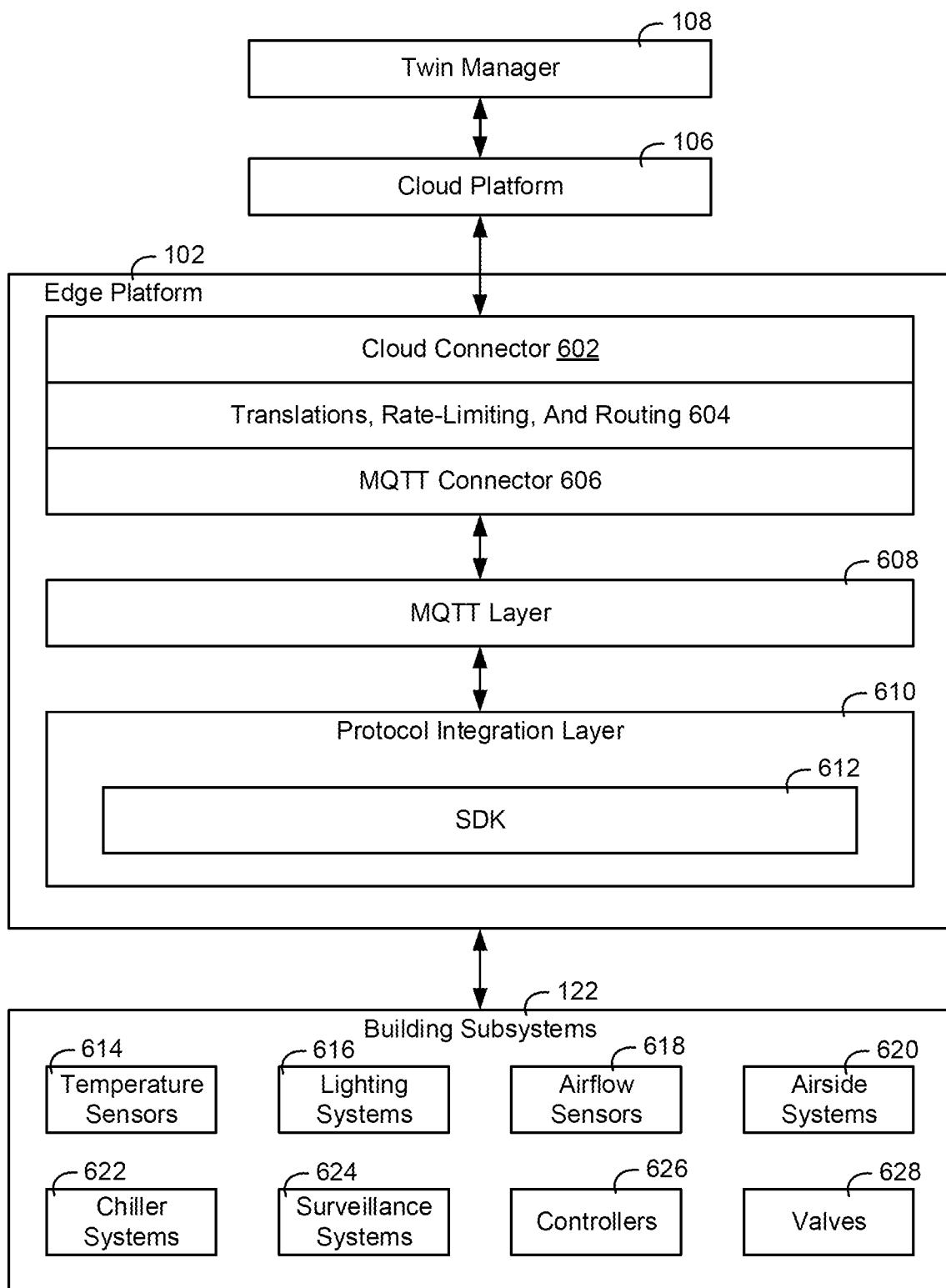
FIG. 6A is another block diagram of the edge platform of FIG. 1 shown in greater detail to include communication layers for facilitating communication between building subsystems and the cloud platform and the twin manager of FIG. 1, according to an exemplary embodiment.

Referring now to FIG. 6A, another block diagram of the edge platform 102 is shown in greater detail to include communication layers for facilitating communication between building subsystems 122 and the cloud platform 106 and/or the twin manager of FIG. 1, according to an exemplary embodiment. The building subsystems 122 may include devices of various different building subsystems, e.g., HVAC subsystems, fire response subsystems, access control subsystems, surveillance subsystems, etc. The devices may include temperature sensors 614, lighting systems 616, airflow sensors 618, airside systems 620, chiller systems 622, surveillance systems 624, controllers 626, valves 628, etc.

The edge platform 102 can include a protocol integration layer 610 that facilities communication with the building subsystems 122 via one or more protocols. In some embodiments, the protocol integration layer 610 can be dynamically updated with a new protocol integration responsive to detecting that a new device is connected to the edge platform 102 and the new device requires the new protocol integration. In some embodiments, the protocol integration layer 610 can be customized through an SDK 612.

Figure 11:
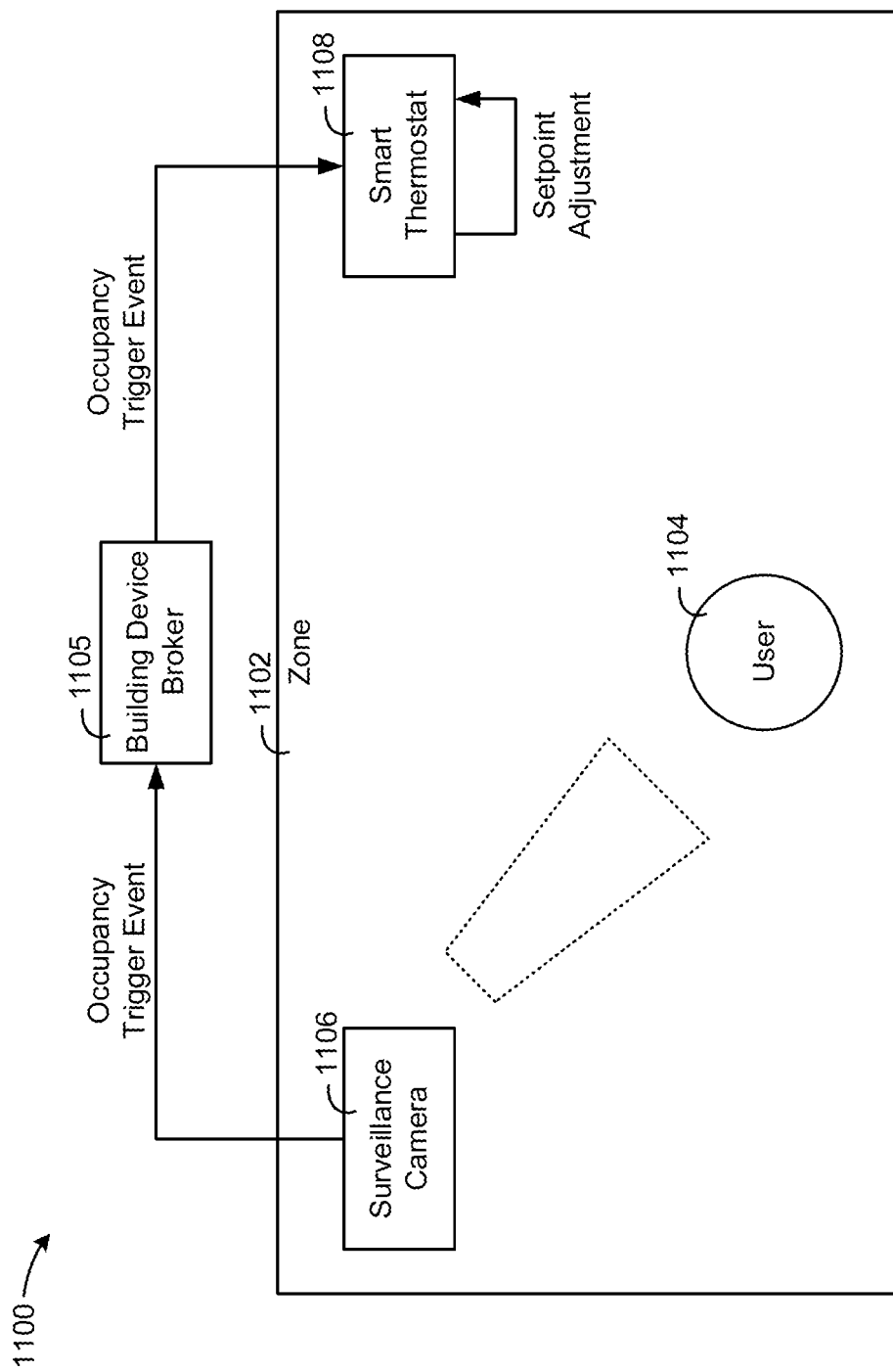
FIG. 11 is a block diagram of a surveillance camera and a smart thermostat for a zone of the building that uses the edge platform of FIG. 1 to perform event based control, according to an exemplary embodiment.

In some embodiments, the edge platform 102 can handle MQTT communication through an MQTT layer 608 and an MQTT connector 606. In some embodiments, the MQTT layer 608 and/or the MQTT connector 606 handles MQTT based communication and/or any other publication/subscription based communication where devices can subscribe to topics and publish to topics. In some embodiments, the MQTT connector 606 implements an MQTT broker configured to manage topics and facilitate publications to topics, subscriptions to topics, etc. to support communication between the building subsystems 122 and/or with the cloud platform 106. An example of devices of a building communicating via a publication/subscription method is shown in FIG. 11.

The edge platform 102 includes a translations, rate-limiting, and routing layer 604. The layer 604 can handle translating data from one format to another format, e.g., from a first format used by the building subsystems 122 to a format that the cloud platform 106 expects, or vice versa. The layer 604 can further perform rate limiting to control the rate at which data is transmitted, requests are sent, requests are received, etc. The layer 604 can further perform message routing, in some embodiments. The cloud connector 602 may connect the edge platform 102, e.g., establish and/or communicate with one or more communication endpoints between the cloud platform 106 and the cloud connector 602.

Figure 6B:
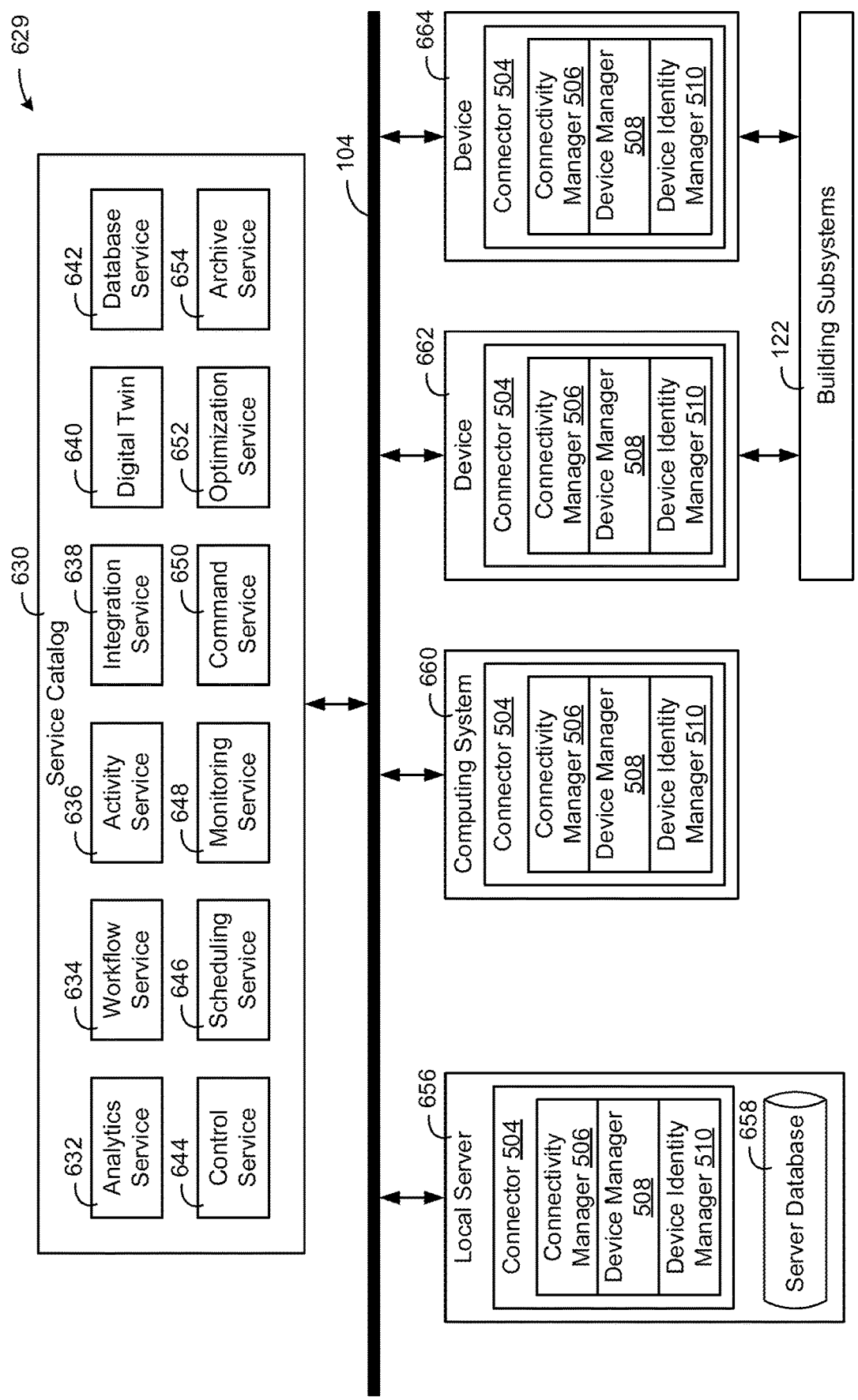
FIG. 6B is another block diagram of the edge platform of FIG. 1 shown distributed across building devices of a building, according to an exemplary embodiment.

Referring now to FIG. 6B, a system 629 where the edge platform 102 is shown distributed across building devices of a building, according to an exemplary embodiment. The local server 656, the computing system 660, the device 662, and/or the device 664 may all be located on-premises within a building, in some embodiments. The various devices 662 and/or 664 may, in some embodiments, be gateway boxes, e.g., gateways 112-116. The gateway boxes may be the various gateways described in U.S. patent application Ser. No. 17/127,303 filed Dec. 18, 2020, the entirety of which is incorporated by reference herein. The computing system 660 could be a desktop computer, a server system, a microcomputer, a mini personal computer (PC), a laptop computer, a dedicated computing resource in a building, etc. The local server 656 may be an on-premises computer system that provides resources, data, services or other programs to computing devices of the building. The system 629 includes a local server 656 that can include a server database 658 that stores data of the building, in some embodiments.

In some embodiments, the device 662 and/or the device 664 implement gateway operations for connecting the devices of the building subsystems 122 with the cloud platform 106 and/or the twin manager 108. In some embodiments, the devices 662 and/or 664 can communicate with the building subsystems 122, collect data from the building subsystems 122, and communicate the data to the cloud platform 106 and/or the twin manager 108. In some embodiments, the devices 662 and/or the device 664 can push commands from the cloud platform 106 and/or the twin manager 108 to the building subsystem 122.

The systems and devices 656-664 can each run an instance of the edge platform 102. In some embodiments, the systems and devices 656-664 run the connector 504 which may include, in some embodiments, the connectivity manager 506, the device manager 508, and/or the device identity manager 510. In some embodiments, the device manager 508 controls what services each of the systems and devices 656-664 run, e.g., what services from a service catalog 630 each of the systems and devices 656-664 run.

The service catalog 630 can be stored in the cloud platform 106, within a local server (e.g., in the server database 658 of the local server 656), on the computing system 660, on the device 662, on the device 664, etc. The various services of the service catalog 630 can be run on the systems and devices 656-664, in some embodiments. The services can further move around the systems and devices 656-664 based on the available computing resources, processing speeds, data availability, the locations of other services which produce data or perform operations required by the service, etc.

The service catalog 630 can include an analytics service 632 that generates analytics data based on building data of the building subsystems 122, a workflow service 634 that implements a workflow, and/or an activity service 636 that performs an activity. The service catalog 630 includes an integration service 638 that integrates a device with a particular subsystem (e.g., a BACnet integration, a Modbus integration, etc.), a digital twin service 640 that runs a digital twin, and/or a database service 642 that implements a database for storing building data. The service catalog 630 can include a control service 644 for operating the building subsystems 122, a scheduling service 646 that handles scheduling of areas (e.g., desks, conference rooms, etc.) of a building, and/or a monitoring service 648 that monitors a piece of equipment of the building subsystem 122. The service catalog 630 includes a command service 650 that implements operational commands for the building subsystems 122, an optimization service 652 that runs an optimization to identify operational parameters for the building subsystems 122, and/or achieve service 654 that archives settings, configurations, etc. for the building subsystem 122, etc.

In some embodiments, the various systems 656, 660, 662, and 664 can realize technical advantages by implementing services of the service catalog 630 locally and/or storing the service catalog 630 locally. Because the services can be implemented locally, i.e., within a building, lower latency can be realized in making control decisions or deriving information since the communication time between the systems 656, 660, 662, and 664 and the cloud is not needed to run the services. Furthermore, because the systems 656, 660, 662, and 664 can run independently of the cloud (e.g., implement their services independently) even if the network 104 fails or encounters an error that prevents comm8unication between the cloud and the systems 656, 660, 662, and 664, the systems can continue operation without interruption. Furthermore, by balancing computation between the cloud and the systems 656, 660, 662, and 664, power usage can be balanced more effectively. Furthermore, the system 629 has the ability to scale (e.g., grow or shrink) the functionality/services provided on edge devices based on capabilities of edge hardware onto which edge system is being implemented.

Figure 7:
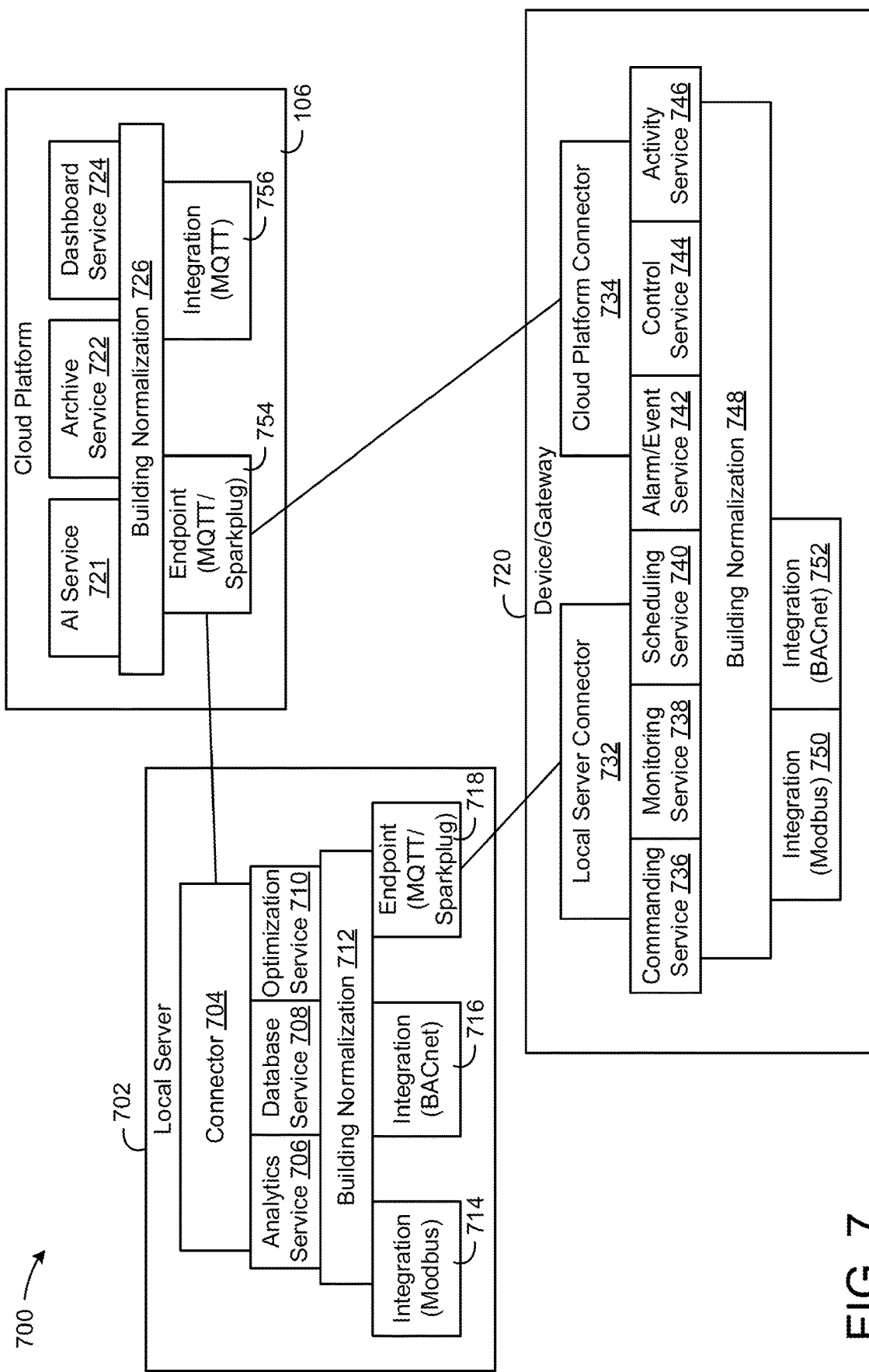
FIG. 7 is a block diagram of components of the edge platform of FIG. 1, including a connector, a building normalization layer, services, and integrations distributed across various computing devices of a building, according to an exemplary embodiment.

Referring now to FIG. 7, a system 700 where connectors, building normalization layers, services, and integrations are distributed across various computing devices of a building is shown, according to an exemplary embodiment. In the system 700, the cloud platform 106, a local server 702, and a device/gateway 720 run components of the edge platform 102, e.g., connectors, building normalization layers, services, and integrations. The local server 702 can be a server system located within a building. The device/gateway 720 could be a building device located within the building, in some embodiments. For example, the device/gateway 720 could be a smart thermostat, a surveillance camera, an access control system, etc. In some embodiments, the device gateway 720 is a dedicated gateway box. The building device may be a physical building device, and may include a memory device (e.g., a flash memory, a RAM, a ROM, etc.). The memory of the physical building device can store one or more data samples, which may be any data related to the operation of the physical building device. For example, if the building device is a smart thermostat, the data samples can be timestamped temperature readings. If the building device is a surveillance camera, the data samples may be The local server 702 can include a connector 704, services 706-710, a building normalization layer 712, and integrations 714-718. These components of the local server 702 can be deployed to the local server 702, e.g., from the cloud platform 106. These components may further be dynamically moved to various other devices of the building, in some embodiments. The connector 704 may be the connector described with reference to FIG. 5 that includes the connectivity manager 506, the device manager 508, and/or the device identity manager 510. The connector 704 may connect the local server 702 with the cloud platform 106, in some embodiments. For example, the connector 704 may enable communication with an endpoint of the cloud platform 106, e.g., the endpoint 754 which could be an MQTT endpoint or a Sparkplug endpoint.

The building normalization layer 712 can be a software component that runs the integrations 714-718 and/or the analytics 706-710. The building normalization layer 712 can be configured to allow for a variety of different integrations and/or analytics to be deployed to the local server 702. In some embodiments, the building normalization layer 712 could allow for any service of the service catalog 630 to run on the local server 702. Furthermore, the building normalization layer 712 can relocate, or allow for relocation, of services and/or integrations across the cloud platform 106, the local server 702, and/or the device/gateway 720. In some embodiments, the services 706-710 are relocatable based on processing power of the local server 702, based on communication bandwidth, available data, etc. The services can be moved from one device to another in the system 700 such that the requirements for the service are met appropriately.

Furthermore, instances of the integrations 714-718 can be relocatable and/or deployable. The integrations 714-718 may be instantiated on devices of the system 700 based on the requirements of the devices, e.g., whether the local server 702 needs to communicate with a particular device (e.g., the Modbus integration 714 could be deployed to the local server 702 responsive to a detection that the local server 702 needs to communicate with a Modbus device). The locations of the integrations can be limited by the physical protocols that each device is capable of implementing and/or security limitations of each device.

In some embodiments, the deployment and/or movement of services and/or integrations can be done manually and/or in an automated manner. For example, when a building site is commissioned, a user could manually select, e.g., via a user interface on the user device 176, the devices of the system 700 where each service and/or integration should run. In some embodiments, instead of having a user select the locations, a system, e.g., the cloud platform 106, could deploy services and/or integrations to the devices of the system 700 automatically based on the ideal locations for each of multiple different services and/or integrations.

In some embodiments, an orchestrator (e.g., run on instances of the building normalization layer 712 or in the cloud platform 106) or a service and/or integration itself could determine that a particular service and/or integration should move from one device to another device after deployment. In some embodiments, as the devices of the system 700 change, e.g., more or less services are run, hard drives are filled with data, physical building devices are moved, installed, and/or uninstalled, the available data, bandwidth, computing resources, and/or memory resources may change. The services and/or integrations can be moved from a first device to a second more appropriate device responsive to a detection that the first device is not meeting the requirements of the service and/or integration.

As an example, an energy efficiency model service could be deployed to the system 700. For example, a user may request that an energy efficiency model service run in their building. Alternatively, a system may identify that an energy efficiency model service would improve the performance of the building and automatically deploy the service. The energy efficiency model service may have requirements. For example, the energy efficiency model may have a high data throughput requirement, a requirement for access to weather data, a high requirement for data storage to store historical data needed to make inferences, etc. In some embodiments, a rules engine with rules could define whether services get pushed around to other devices, whether model goes back to the cloud for more training, whether an upgrade is needed to implement an increase in points, etc.

As another example, a historian service may manage a log of historical building data collected for a building, e.g., store a record of historical temperature measurements of a building, store a record of building occupant counts, store a record of operational control decisions (e.g., setpoints, static pressure setpoints, fan speeds, etc.), etc. One or more other services may depend on the historian, for example, the one or more other services may consume historical data recorded by the historian. In some embodiments, other services can be relocated along with the historian service such that the other services can operate on the historian data. For example, an occupancy prediction service may need a historical log of occupancy record by the historian service to run. In some embodiments, instead of having the occupancy prediction service and the historian run on the same physical device, a particular integrations between the two devices that the historian service and the occupancy prediction service run on could be established such that occupancy data of the historian service can be provided from the historian service to the occupancy prediction service.

This portability of services and/or integrations removes dependencies between hardware and software. Allowing services and/or integrations to move from one device to another device can keep services running continuously even if the run on a variety of locations. This decouples software from hardware.

In some embodiments, the building normalization layer 712 can facilitate auto discovery of devices and/or perform auto configuration. In some embodiments, the building normalization 726 of the cloud platform 106 performs the auto discovery. In some embodiments, responsive to detecting a new device connected to the local server 702, e.g., a new device of the building subsystems 122, the building normalization can identify points of the new device, e.g., identify measurement points, control points, etc. In some embodiments, the building normalization layer 712 performs a discovery process where strings, tags, or other metadata is analyzed to identify each point. In some embodiments, a discover process as discussed in U.S. patent application Ser. No. 16/885,959 filed May 28, 2020, U.S. patent application Ser. No. 16/885,968 filed May 28, 2020, U.S. patent application Ser. No. 16/722,439 filed Dec. 20, 2019 (now U.S. Pat. No. 10,831,163), and U.S. patent application Ser. No. 16/663,623 filed Oct. 25, 2019, which are incorporated by reference herein in their entireties.

In some embodiments, the cloud platform 106 performs a site survey of all devices of a site or multiple sites. For example, the cloud platform 106 could identify all devices installed in the system 700. Furthermore, the cloud platform 106 could perform discovery for any devices that are not recognized. The result of the discovery of a device could be a configuration for the device, for example, indications of points to collect data from and/or send commands to. The cloud platform 106 can, in some embodiments, distribute a copy of the configuration for the device to all of the instances of the building normalization layer 712. In some embodiments, the copy of the configuration can be distributed to other buildings different from the building that the device was discovered at. In this regard, responsive to a similar device type being installed somewhere else, e.g., in the same building, in a different building, at a different campus, etc. the instance of the building normalization can select the copy of the device configuration and implement the device configuration for the device.

Similarly, if the instance of the building normalization detects a new device that is not recognized, the building normalization could perform a discovery process for the new device and distribute the configuration for the new device to other instances of the building normalization. In this regard, each building normalization instance can implement learning by discovering new devices and injecting device configurations into a device catalog stored and distributed across each building normalization instance.

In some embodiments, the device catalog can store names of every data point of every device. In some embodiments, the services that operate on the data points can consume the data points based on the indications of the data points in the device catalog. Furthermore, the integrations may collect data from data points and/or send actions to the data points based on the naming of the device catalog. In some embodiments, the various building normalization and synchronize the device catalogs they store. For example, changes to one device catalog can be distributed to other building normalizations. If a point name was changed for a device, this change could be distributed across all building normalizations through the device catalog synchronization such that there are no disruptions to the services that consume the point.

The analytics service 706 may be a service that generates one or more analytics based on building data received from a building device, e.g., directly from the building device or through a gateway that communicates with the building device, e.g., from the device/gateway 720. The analytics service 706 can be configured to generate an analytics data based on the building data such as a carbon emissions metric, an energy consumption metric, a comfort score, a health score, etc. The database service 708 can operate to store building data, e.g., building data collected from the device/gateway 720. In some embodiments, the analytics service 706 may operate against historical data stored in the database service 708. In some embodiments, the analytics service 706 may have a requirement that the analytics service 706 is implemented with access to a database service 706 that stores historical data. In this regard, the analytics service 706 can be deployed to, or relocated to a device including an instantiation of the database service 708. In some embodiments, the database service 708 could be deployed to the local server 702 responsive to determining that the analytics service 706 requires the database service 708 to run.

The optimization service 710 can be a service that operates to implement an optimization of one or more variables based on one or more constraints. The optimization service 710 could, in some embodiments, implement optimization for allocating loads, making control decisions, improving energy usage and/or occupant comfort etc. The optimization performed by the optimization service 710 could be the optimization described in U.S. patent application Ser. No. 17/542,184 filed Dec. 3, 2021, which is incorporated by reference herein.

The Modbus integration 714 can be a software component that enables the local server 702 to collect building data for data points of building devices that operate with a Modbus protocol. Furthermore, the Modbus integration 714 can enable the local server 702 to communicate data, e.g., operating parameters, setpoints, load allocations, etc. to the building device. The communicated data may, in some embodiments, be control decisions determined by the optimization service 710.

Similarly, the BACnet integration 716 can enable the local server 702 to communicate with one or more BACnet based devices, e.g., send data to, or receive data from, the BACnet based devices. The endpoint 718 could be an endpoint for MQTT and/or Sparkplug. In some embodiments, the element 718 can be a software service including an endpoint and/or a layer for implementing MQTT and/or Sparkplug communication. In the system 700, the endpoint 718 can be used for communicating by the local server 702 with the device/gateway 720, in some embodiments.

The cloud platform 106 can include an artificial intelligence (AI) service 721, an archive service 722, and/or a dashboard service 724. The AI service 721 can run one or more artificial intelligence operations, e.g., inferring information, performing autonomous control of the building, etc. The archive service 722 may archive building data received from the device/gateway 720 (e.g., collected point data). The archive service 722 may, in some embodiments, store control decisions made by another service, e.g., the AI service 721, the optimization service 710, etc. The dashboard service 724 can be configured to provide a user interface to a user with analytic results, e.g., generated by the analytics service 706, command interfaces, etc. The cloud platform 106 is further shown to include the building normalization 726, which may be an instance of the building normalization layer 712.

The cloud platform 106 further includes an endpoint 754 for communicating with the local server 702 and/or the device/gateway 720. The cloud platform 106 may include an integration 756, e.g., an MQTT integration supporting MQTT based communication with MQTT devices.

The device/gateway 720 can include a local server connector 732 and a cloud platform connector 734. The cloud platform connector 734 can connect the device/gateway 720 with the cloud platform 106. The local server connector 732 can connect the device/gateway 720 with the local server 702. The device/gateway 720 includes a commanding service 736 configured to implement commands for devices of the building subsystems 122 (e.g., the device/gateway 720 itself or another device connected to the device/gateway 720). The monitoring service 738 can be configured to monitor operation of the devices of the building subsystems 122, the scheduling service 740 can implement scheduling for a space or asset, the alarm/event service 742 can generate alarms and/or events when specific rules are tripped based on the device data, the control service 744 can implement a control algorithm and/or application for the devices of the building subsystems 122, and/or the activity service 746 can implement a particular activity for the devices of the building subsystems 122.

The device/gateway 720 further includes a building normalization 748. The building normalization 748 may be an instance of the building normalization layer 712, in some embodiments. The device/gateway 720 may further include integrations 750-752. The integration 750 may be a Modbus integration for communicating with a Modbus device. The integration 752 may be a BACnet integration for communicating with BACnet devices.

Figure 8:
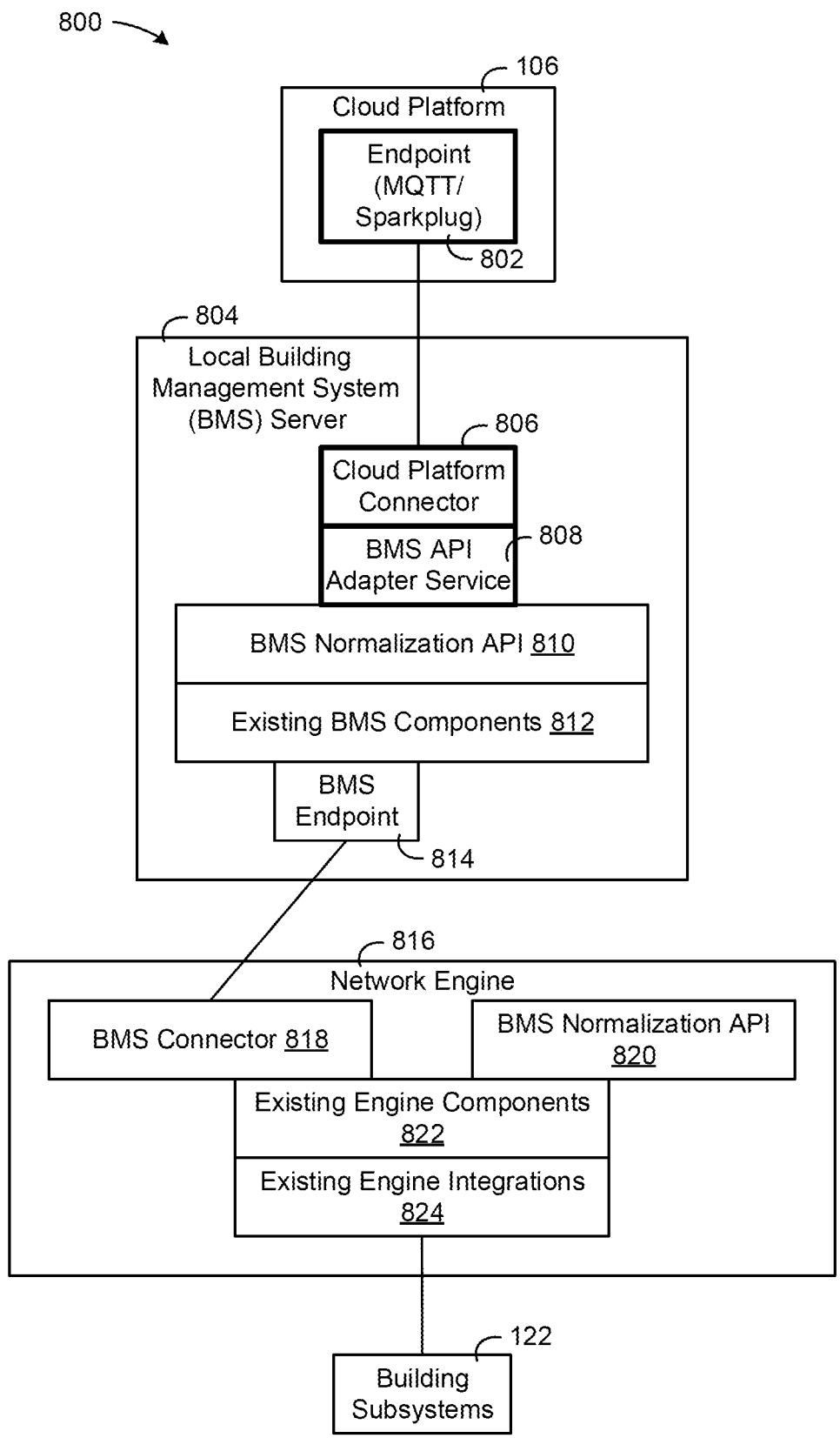
FIG. 8 is a block diagram of a local building management system (BMS) server including a connector and an adapter service of the edge platform of FIG. 1 that operate to connect an engine with the cloud platform of FIG. 1, according to an exemplary embodiment.

Referring now to FIG. 8, system 800 including a local building management system (BMS) server 804 including a cloud platform connector 806 and a BMS API adapter service 808 that operate to connect a network engine 816 with the cloud platform 106 is shown, according to an exemplary embodiment. The components 802, 806, and 808 may be components of the edge platform 102, in some embodiments. In some embodiments, the cloud platform connector 806 is the same as, or similar to, the connector 504, e.g., includes the connectivity manager 506, the device manager 508, and/or the device identity manager 510.

The local BMS server 804 may be a server that implements building applications and/or data collection. The building applications can be the various services discussed herein, e.g., the services of the service catalog 630. In some embodiments, the BMS server 804 can include data storage for storing historical data. In some embodiments, the local BMS server 804 can be the local server 656 and/or the local server 702. In some embodiments, the local BMS server 804 can implement user interfaces for viewing on a user device 176. The local BMS server 804 includes a BMS normalization API 810 for allowing external systems to communicate with the local BMS server 804. Furthermore, the local BMS server 804 includes BMS components 812. These components may implement the user interfaces, applications, data storage and/or logging, etc. Furthermore, the local BMS server 804 includes a BMS endpoint 814 for communicating with the network engine 816. The BMS endpoint 814 may also connect to other devices, for example, via a local or external network. The BMS endpoint 814 can connect to any type of device capable of communicating with the local BMS server 804.

The system 800 includes a network engine 816. The network engine 816 can be configured to handle network operations for networks of the building. For example, the engine integrations 824 of the network engine 816 can be configured to facilitate communication via BACnet, Modbus, CAN, N2, and/or any other protocol. In some embodiments, the network communication is non-IP based communication. In some embodiments, the network communication is IP based communication, e.g., Internet enabled smart devices, BACnet/IP, etc. In some embodiments, the network engine 816 can communicate data collected from the building subsystems 122 and pass the data to the local BMS server 804.

In some embodiments, the network engine 816 includes existing engine components 822. The engine components 822 can be configured to implement network features for managing the various building networks that the building subsystems 122 communicate with. The network engine 816 may further include a BMS normalization API 820 that implements integration with other external systems. The network engine 816 further includes a BMS connector 818 that facilitates a connection between the network engine 816 and a BMS endpoint 814. In some embodiments, the BMS connector 818 collects point data received from the building subsystems 122 via the engine integrations 824 and communicates the collected points to the BMS endpoint 814.

In the system 800, the local BMS server 804 can be adapted to facilitate communication between the local BMS server 804, the network engine 816, and/or the building subsystems 122 with the cloud platform 106. In some embodiments, the adaption can be implemented by deploying an endpoint 802 to the cloud platform 106. The endpoint 802 can be an MQTT and/or Sparkplug endpoint, in some embodiments. Furthermore, a cloud platform connector 806 could be deployed to the local BMS server 804. The cloud platform connector 806 could facilitate communication between the local BMS server 804 and the cloud platform 106. Furthermore, a BMS API adapter service 808 can be deployed to the local BMS server 804 to implement an integration between the cloud platform connector 806 and the BMS normalization API 810. The BMS API adapter service 808 can form a bridge between the existing BMS components 812 and the cloud platform connector 806.

Figure 9:
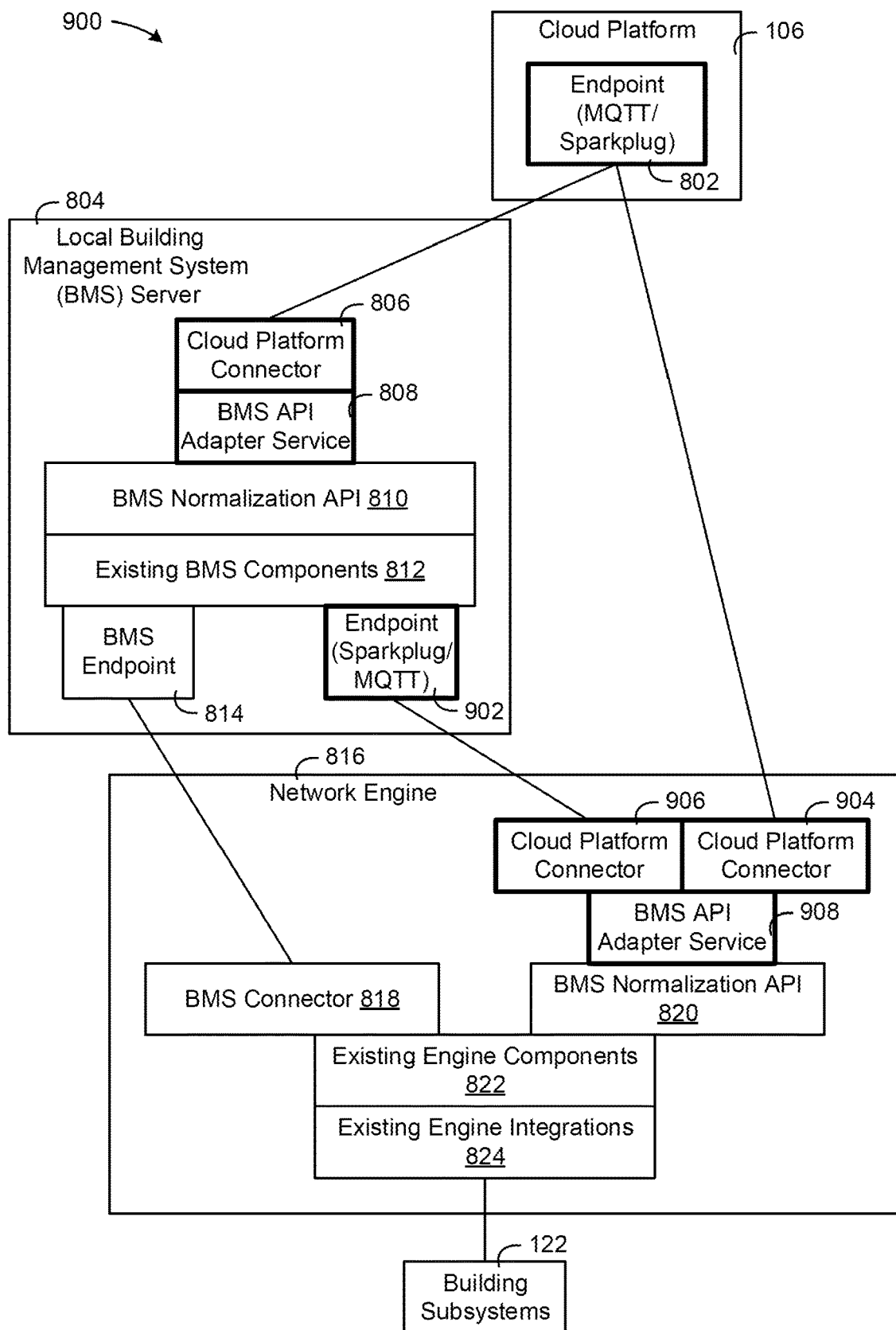
FIG. 9 is a block diagram of the engine of FIG. 8 including connectors and an adapter service to connect the engine with the local BMS server of FIG. 8 and the cloud platform of FIG. 1, according to an exemplary embodiment.

Referring now to FIG. 9, a system 900 including the local BMS server 804, the network engine 816, and the cloud platform 106 is shown where the network engine 816 includes connectors and an adapter service that connect the engine with the local BMS server 804 and the cloud platform 106, according to an exemplary embodiment. In the system 900, the network engine 816 can be adapted to facilitate communication directly between the network engine 816 and the cloud platform 106.

In the system 900, reusable cloud connector components and/or a reusable adapter service are deployed to the network engine 816 to enable the network engine 816 to communicate directly with the cloud platform 106 endpoint 802. In this regard, components of the edge platform 102 can be deployed to the network engine 816 itself allowing for plug and play on the engine such that gateway functions can be run on the network engine 816 itself.

In the system 900, a cloud platform connector 906 and a cloud platform connector 904 can be deployed to the network engine 816. The cloud platform connector 906 and/or the cloud platform connector 904 can be instances of the cloud platform 806. Furthermore, an endpoint 902 can be deployed to the local BMS server 804. The endpoint 902 can be a sparkplug and/or MQTT endpoint. The cloud platform connector 906 can be configured to facilitate communication between the network engine 816 and the endpoint 902. In some embodiments, point data can be communicated between the building subsystems 122 and the endpoint 902. Furthermore, the cloud platform connector 904 can configured to facilitate communication between the endpoint 802 and the network engine 816, in some embodiments. A BMS API adapter service 908 can integrate the cloud platform connector 906 and/or the cloud platform connector 904 with the BMS normalization API 820.

Figure 10:
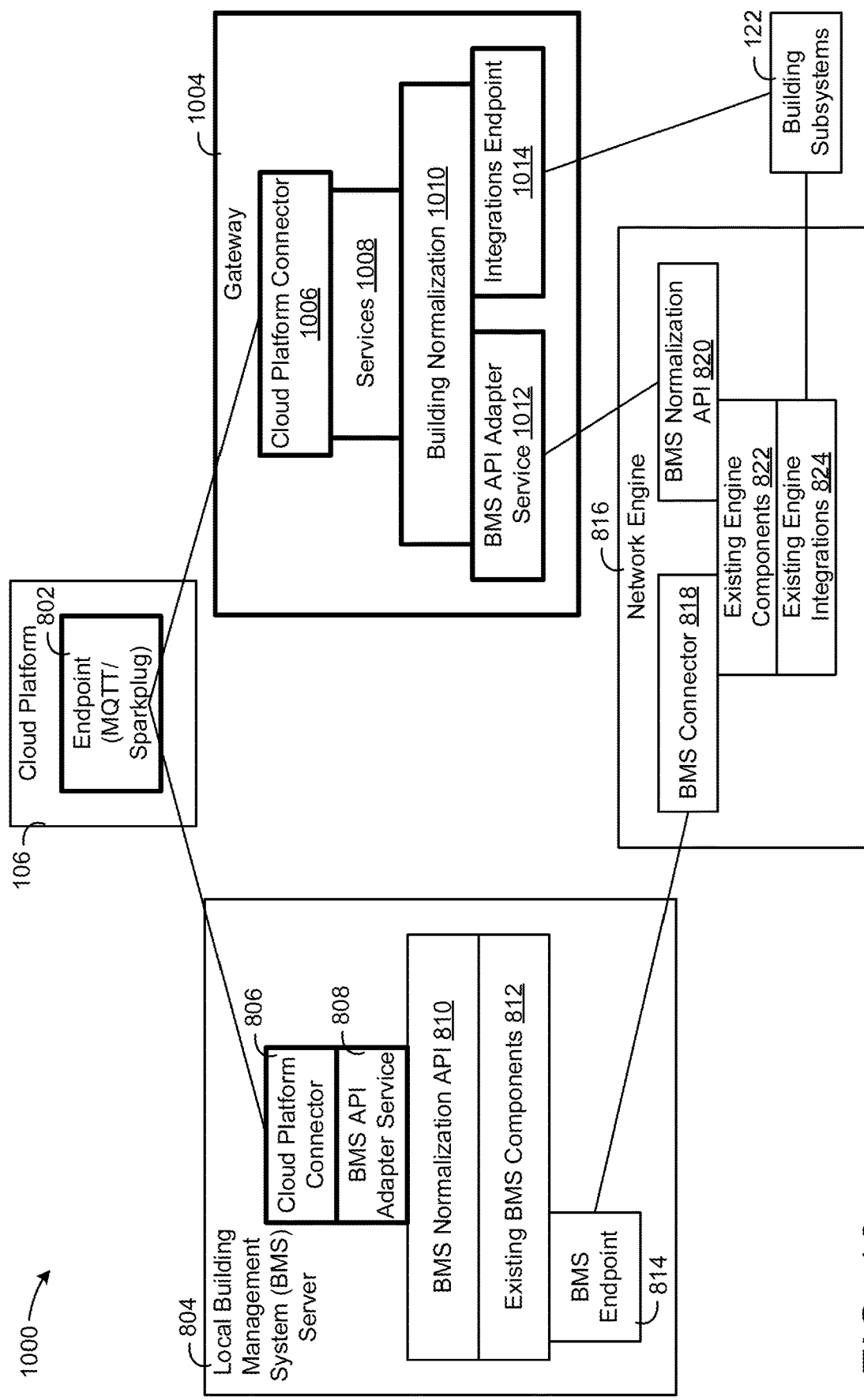
FIG. 10 is a block diagram of a gateway including an adapter service connecting the engine of FIG. 8 to the cloud platform of FIG. 1, according to an exemplary embodiment.

Referring now to FIG. 10, a system 1000 including a gateway 1004 including a BMS adapter service application programming interface (API) connecting the network engine 816 to the cloud platform 106 is shown, according to an exemplary embodiment. In the system 1000, the gateway 1004 can facilitate communication between the cloud platform 106 and the network engine 816, in some embodiments. The gateway 1004 can be a physical computing system and/or device, e.g., one of the gateways 112-116. The gateway 1004 can be the instance of the edge platform 102 described in FIG. 5 and/or FIG. 6A.

In some embodiments, the gateway 1004 can be deployed on a computing node of a building that the gateway software, e.g., the components 1006-1014. In some embodiments, the gateway 1004 can be installed in a building as a new physical device. In some embodiments, gateway devices can be built on computing nodes of a network to communicate with legacy devices, e.g., the network engine 816 and/or the building subsystems 122. In some embodiments, the gateway 1004 can be deployed to a computing system to enable the network engine 816 to communicate with the cloud platform 106. In some embodiments, the gateway 1004 is a new physical device and/or is a modified existing gateway. In some embodiments, the cloud platform 106 can identify what physical devices are near and/or are connected to the network engine 816. The cloud platform 106 can deploy the gateway 1004 to the identified physical device. Some pieces of the software stack of the gateway may be legacy.

The gateway 1004 can include a cloud platform connector 1006 configured to facilitate communication between the endpoint 802 of the cloud platform 106 and/or the gateway 1004. The cloud platform connector 1006 can be an instance of the cloud platform 806 and/or the connector 504. The gateway 1004 can further include services 1008. The services 1008 can be the services described with reference to FIGS. 6B and/or 7. The gateway 1004 further includes a building normalization 1010. The building normalization 1010 can be the same as or similar to the building normalizations layers 712, 728, and/or 748 described with reference to FIG. 7. The gateway 1004 further includes a BMS API adapter service 1012 that can be configured to facilitate communication with the BMS normalization API 820. The BMS API adapter service 1012 can be the same as and/or similar to the BMS API adapter service 808 and/or the BMS API adapter service 908. The gateway 1004 may further include integrations endpoint 1014 which may facilitate communication directly with the building subsystems 122.

In some embodiments, the gateway 1004, via the cloud platform connector 1006 and/or the BMS API adapter service 1012 can facilitate direct communication between the network engine 816 and the cloud platform 106. For example, data collected from the building subsystems 122 can be collected via the engine integrations 824 and communicated to the gateway 1004 via the BMS normalization API 820 and the BMS API adapter service 1012. The cloud platform connector 1006 can communicate the collected data points to the endpoint 802 of the cloud platform 106. The BMS API adapter service 1012 and the BMS API adapter service 808 can be common adapters which can make calls and/or responses to the BMS normalization API 810 and/or the BMS normalization API 820.

The gateway 1004 can allow for the addition of services (e.g., the services 1008) and/or integrations (e.g., integrations endpoint 1014) to the system 1000 that may not be deployable to the local BMS server 804 and/or the network engine 816. In FIG. 10, the network engine 816 is not adapted but is brought into the ecosystem of the system 1000 through the gateway 1004, in comparison to the deployed connectivity to the local BMS server 804 in FIG. 8 and the deployed connectivity to the network engine 816 of FIG. 9.

Referring now to FIG. 11, a system 1100 including a surveillance camera 1106 and a smart thermostat 1108 for a zone 1102 of the building that uses the edge platform 102 to facilitate event based control is shown, according to an exemplary embodiment. In the system 1100, the surveillance camera 1106 and/or the smart thermostat 1108 can run gateway components of the edge platform 102. For example, the surveillance camera 1106 and/or the smart thermostat 1108 could include the connector 504. In some embodiments, the surveillance camera 1106 and/or the smart thermostat 1108 can include an endpoint, e.g., an MQTT endpoint such as the endpoints described in FIGS. 7-10.

In some embodiments, the surveillance camera 1106 and/or the smart thermostat 1108 are themselves gateways. The gateways may be built in a portable language such as RUST and embedded within the surveillance camera 1106 and/or the smart thermostat 1108. In some embodiments, one or both of the surveillance camera 1106 and/or the smart thermostat 1108 can implement a building device broker 1105. In some embodiments, the building device broker 1105 can be implemented on a separate building gateway, e.g., the device/gateway 720 and/or the gateway 1004.

In some embodiments, the surveillance camera 1106 can perform motion detection, e.g., detect the presence of the user 1104. In some embodiments, responsive to detecting the user 1104, the surveillance camera 1106 can generate an occupancy trigger event. The occupancy trigger event can be published to a topic by the surveillance camera 1106. The building device broker 1105 can, in some embodiments, handle various topics, handle topic subscriptions, topic publishing, etc. In some embodiments, the smart thermostat 1108 may be subscribed to an occupancy topic for the zone 1102 that the surveillance camera 1106 publishes occupancy trigger events to. The smart thermostat 1108 may, in some embodiments, adjust a temperature setpoint responsive to receiving an occupancy trigger event being published to the topic.

In some embodiments, an IoT platform and/or other application is subscribed to the topic that the surveillance camera 1106 subscribes to and commands the smart thermostat 1108 to adjust its temperature setpoint responsive to detecting the occupancy trigger event. In some embodiments the events, topics, publishing, and/or subscriptions are MQTT based messages. In some embodiments, the event communicated by the surveillance camera 1106 is an Open Network Video Interface Forum (ONVIF) event.

Figure 12:
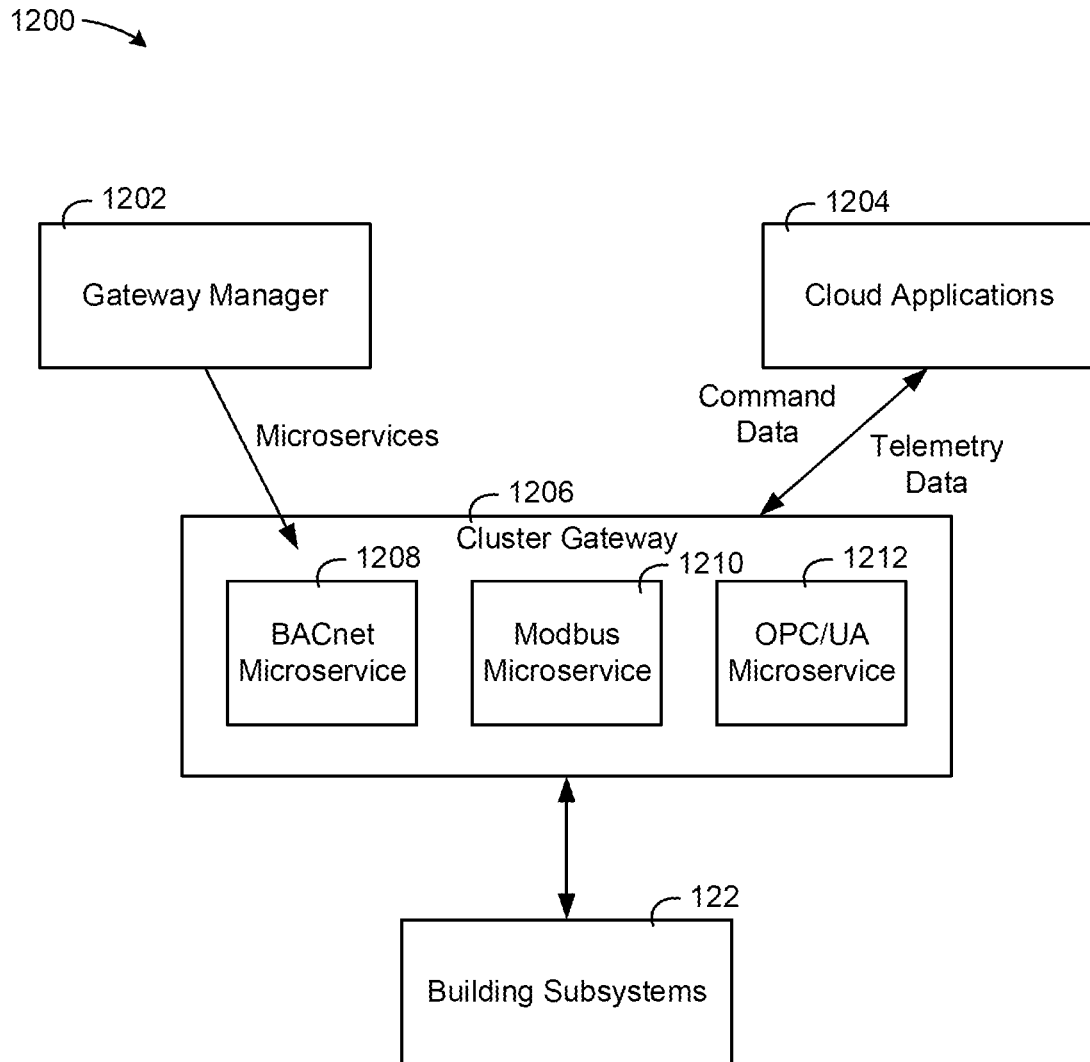
FIG. 12 is a block diagram of a cluster based gateway that runs micro-services for facilitating communication between building subsystems and cloud applications, according to an exemplary embodiment.

Referring now to FIG. 12, a system 1200 including a cluster based gateway 1206 that runs micro-services for facilitating communication between building subsystems 122 and cloud applications 1204 is shown, according to an exemplary embodiment. In some embodiments, to collect telemetry data from building subsystems 122 (e.g., BMS systems, fire systems, security systems, etc.), the system 1200 includes a gateway which collects data from the building subsystems 122 and communicates the information to the cloud, e.g., to the cloud applications 1204, the cloud platform 106, etc.

In some embodiments, such a gateway could include a mini personal computer (PC) with various software connectors that connect the gateway to the building subsystems 122, e.g., a BACnet connector, an OPC/UA connector, a Modbus connector, a Transmission Control Protocol and Internet Protocol TCP/IP connector, and/or various other protocols. In some embodiments, the mini PC runs an operating system that hosts various micro-services for the communication.

In some embodiments, hosting a mini PC in a building has issues. For example, the operating system on the mini PC may need to be updated for security patches and/or operating system updates. This might result in impacting the micro-services which the mini PC runs. Micro-services may stop, may be deleted, and/or may have to updated to manage the changes in operating system. Furthermore, the mini PC may need to be managed by a local building information technologies (IT) team. The mini PC may be impacted by the building network and/or IT policies on the network. The mini PC may need to be commissioned by a technician visit to a local site. Similarly, a site visit by the technician may be required for trouble shooting any time that the mini PC encounters issues. For an increase in demand for the services of the mini PC, a technician may need to visit the site to make physical and/or software updates to the mini PC, which may incur additional cost for field testing and/or certifying new hardware and/or software.

To solve one or more of these issues, the system 1200 could include a cluster gateway 1206. The cluster gateway 1206 cold be a cluster including one or more micro-services in containers. For example, the cluster gateway 1206 could be a Kubernetes cluster with docker instances of micro-services. For example, the cluster gateway 1206 could run a BACnet micro-serve 1208, a Modbus micro-service 1210, and/or an OPC/U micro-service 1212. The cluster gateway 1206 can replace the mini PC with a more generic hardware device with the capability to host one or more different and/or changing containers.

In some embodiments, software updates to the cluster gateway 1206 can be managed centrally by a gateway manager 1202. The gateway manager 1202 could push new micro-services, e.g., a BACnet micro-service, a Modbus micro-service 1210, and/or a OPC/UA micro-service to the cluster gateway 1206. In this manner, software upgrades are not dependent on an IT infrastructure at a building. A building owner may manage the underlying hardware that the cluster gateway 1206 runs on while the cluster gateway 1206 may be managed by a separate development entity. In some embodiments, commissioning for the cluster gateway 1206 is managed remotely. Furthermore, the workload for the cluster gateway 1206 can be managed, in some embodiments. In some embodiments, the cluster gateway 1206 runs independent of the hardware on which it is hosted, and thus any underlying hardware upgrades do not require testing for software tools and/or software stack of the cluster gateway 1206.

The gateway manager 1202 can be configured to install and/or upgrade the cluster gateway 1206. The gateway manager 1202 can make upgrades to the micro-services that the cluster gateway 1206 runs and/or make upgrades to the operating environment of the cluster gateway 1206. In some embodiments, upgrades, security patches, new software, etc. can be pushed by the gateway manager 1202 to the cluster gateway 1206 in an automated manner. In some embodiments, errors and/or issues of the cluster gateway 1206 can be managed remotely and users can receive notifications regarding the errors and/or issues. In some embodiments, commissioning for the cluster gateway 1206 can be automated and the cluster gateway 1206 can be set up to run on a variety of different hardware environments.

In some embodiments, the cluster gateway 1206 can provide telemetry data of the building subsystems 122 to the cloud applications 1204. Furthermore, the cloud applications 1204 can provide command and control data to the cluster gateway 1206 for controlling the building subsystems 122. In some embodiments, command and/or control operations can be handled by the cluster gateway 1206. This may provide the ability to manage the demand and/or bandwidth requirements of the site by commanding the various containers including the micro-services on the cluster gateway 1206. This may allow for the management of upgrades and/or testing. Furthermore, this may allow for the replication of development, testing, and/or production environments. The cloud applications 1204 could be energy management applications, optimization applications, etc. In some embodiments, the cloud applications 1204 are the applications 110. In some embodiments, the cloud applications 1204 are the cloud platform 106.

Figure 13:
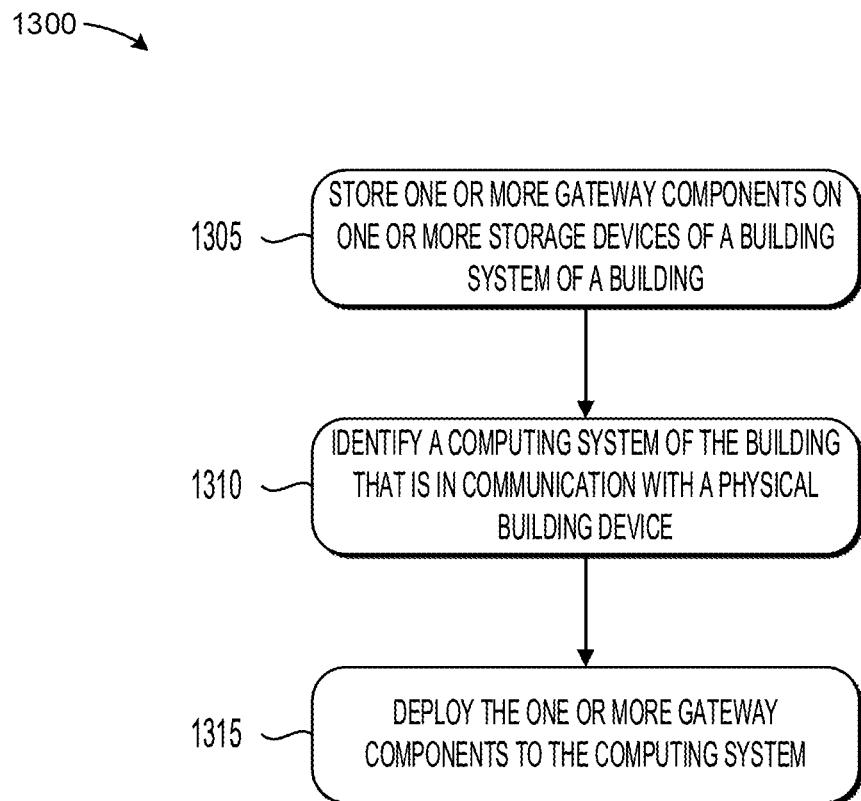
FIG. 13 is a flow diagram of an example method for deploying gateway components on one or more computing systems of a building, according to an exemplary embodiment.

Referring to FIG. 13, illustrated is a flow diagram of an example method 1300 for deploying gateway components on one or more computing systems of a building, according to an exemplary embodiment. In various embodiments, the local server 702 performs the method 1300. However, it should be understood that any computing system described herein may perform any or all of the operations described in connection with the method 1300. For example, in some embodiments, the cloud platform 106 performs method 1300. In yet other embodiments, the local server 702 may perform the method 1300. For example, the cloud platform 106 may perform method 1300 to deploy gateway components on one or more computing devices (e.g., the local server 702, the device/gateway 720, the local BMS server 804, the network engine 816, the gateway 1004, the gateway manager 1202, the cluster gateway 1206, any other computing systems or devices described herein, etc.) in a building, which may collect, store, process, or otherwise access data samples received via one or more physical building devices. The data samples may be sensor data, operational data, configuration data, or any other data described herein. The computing system performing the operations of the method 1300 is referred to herein as the "building system."

At step 1305, the building system can store one or more gateway components on one or more storage devices of the building system. The building system may be located within, or located remote from, the building to which the building system corresponds. The gateway components stored on the storage devices of the building system can facilitate communication with a cloud platform (e.g., the cloud platform 106) and facilitate communication with a physical building device (e.g., the device/gateway 720, the building subsystems 122, etc.). The gateway components can be, for example, any of the, connectors, building normalization layers, services, or integrations described herein, including but certainly not limited to the connector 704, services 706-710, a building normalization layer 712, and integrations 714-718, among other components, software, integrations, configuration settings, or any other software-related data described in connection with FIGS. 1-12.

At step 1310, the building system can identify a computing system of the building that is in communication with the physical building device, the physical building device storing one or more data samples. Identifying the computing system can include accessing a database or lookup table of computing systems or devices that are present within or otherwise associated with managing one or more aspects of the building. In some implementations, the building system can query a network of the building to which the building system is communicatively coupled, to identify one or more other computing systems on the network. The computing systems may be associated with respective identifiers, and may communicate with the building system via the network or another suitable communications interface, connector, or integration, as described herein. The computing system may be in communication with one or more physical building devices, as described herein. In some implementations, the building system can identify each of the computing systems of the building that are in communication with at least one physical building device.

At step 1315, the building system can deploy the one or more gateway components to the identified computing system responsive to identifying that the computing system is in communication with the physical building device(s). For example, the building system can utilize one or more communication channels, which may be established via a network of the building, to transmit the gateway components to each of the identified computing systems of the building. Deploying the one or more gateway components can include installing or otherwise configuring the gateway components to execute at the one or more identified computing systems. Generally, the gateway components can be executed to perform any of the operations described herein. Deploying the gateway components can include forming storing computer-executable instructions corresponding to the gateway components at the identified computing systems. In some implementations, the particular gateway components deployed at an identified computing system can be selected based on the type of the physical building device to which the identified computing system is connected. Likewise, in some embodiments, the particular gateway components deployed at an identified computing system can be selected to correspond to an operation, type, or processing capability of the identified computing system, among other factors as described herein. Deploying the gateway components may include storing the gateway components in one or more predetermined memory regions at the computing system (e.g., in a particular directory, executable memory region, etc.), and may include installing, configuring, or otherwise applying one or more configuration settings for the gateway components or for the operation of the computing system.

As described herein, the one or more gateway components can include any type of software component, hardware configuration settings, or combinations thereof. The gateway components may include processor-executable instructions, which can be executed by the computing system to which the gateway component(s) are deployed. The one or more gateway components can cause the computing system to communicate with the physical building device to receive the one or more data samples (e.g., via one or more networks or communication interfaces). Additionally, the one or more gateway components cause the computing system to communicate the one or more data samples to the cloud platform. For example, the gateway components can include one or more adapters or communication software APIs that facilitate communication between computing devices within, and external to, the building. The gateway components may include adapters that cause the computing system to communicate with one or more network engines. The gateway components can include instructions that, when executed by the computing system, cause the computing system to detect a new physical building device connected to the computing system (e.g., by searching through different connected devices by device identifier, etc.), and then search a device library for a configuration of the new physical building device. Using the configuration for the new physical device, the gateway components can cause the computing system to implement the configuration to facilitate communication with the new physical building device. The gateway components can also perform a discovery process to discover the configuration for the new physical building device and store the configuration in the device library, for example, if the device library did not include the configuration. The device library can be stored at the cloud platform or on the one or more gateway components themselves. In some implementations, the device library is distributed across one or more instances of the one or more gateway components in a plurality of different buildings, and may be retrieved, for example, by accessing one or more networks to communicate with the multiple instances of gateway components to retrieve portions of, or all of, the device library. The gateway components can receive one or more values for control points of the physical building device, for example, from the building system, from the cloud platform, or from another system or device described herein, and communicate the one or more values to the control points of the physical building device via the one or more gateway components.

The one or more gateway components can include a building service that causes the computing system to generate data based on the one or more data samples, which may be analytics data or any other type of data described herein that may be based on or associated with the data samples. When deploying the gateway components, the building system can identify one or more requirements for the building service, or any other of the gateway components. The requirements may include required processing resources, storage resources, data availability, or a presence of another building service executing at the computing system. The building system can query the computing system to determine the current operating characteristics (e.g., processing resources, storage resources, data availability, or a presence of another building service executing at the computing system, etc.), to determine that the computing system meets the one or more requirements for the gateway component(s). If the computing system meets the requirements, the building system can deploy the corresponding gateway components to the computing system. If the requirements are not met, the building system may deploy the gateway components to another computing system. The building system can periodically query, or otherwise receive messages from, the computing system that indicate the current operating characteristics of the computing system. In doing so, the building system can identify whether the requirements for the building service (or other gateway components) are no longer met by the computing system. If the requirements are no longer met, the building system can move (e.g., terminate execution of the gateway components or remove the gateway components from the computing system, and re-deploy the gateway components) the gateway components (e.g., the building service) from the computing system to a different computing system that meets the one or more requirements of the building service or gateway component(s).

Figure 14:
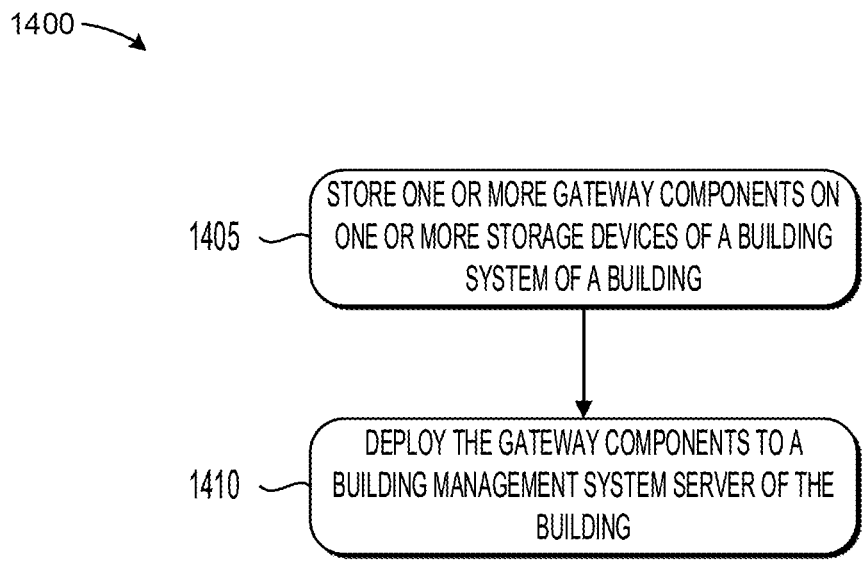
FIG. 14 is a flow diagram of an example method for deploying gateway components on a local BMS server, according to an exemplary embodiment.

Referring to FIG. 14 is a flow diagram of an example method 1400 for deploying gateway components on a local BMS server, according to an exemplary embodiment. In various embodiments, the local server 702 performs the method 1400. However, it should be understood that any computing system described herein may perform any or all of the operations described in connection with the method 1400. For example, in some embodiments, the cloud platform 106 performs method 1400. In yet other embodiments, the local server 702 may perform the method 1400. For example, the cloud platform 106 may perform method 1400 to deploy gateway components on one or more computing devices (e.g., the local server 702, the device/gateway 720, the local BMS server 804, the network engine 816, the gateway 1004, the gateway manager 1202, the cluster gateway 1206, any other computing systems or devices described herein, etc.) in a building, which may collect, store, process, or otherwise access data samples received via one or more physical building devices. The data samples may be sensor data, operational data, configuration data, or any other data described herein. The computing system performing the operations of the method 1400 is referred to herein as the "building system."

At step 1405, the building system can store one or more gateway components on one or more storage devices of the building system. The building system may be located within, or located remote from, the building to which the building system corresponds. The gateway components stored on the storage devices of the building system can facilitate communication with a cloud platform (e.g., the cloud platform 106) and facilitate communication with a physical building device (e.g., the device/gateway 720, the building subsystems 122, etc.). The gateway components can be, for example, any of the, connectors, building normalization layers, services, or integrations described herein, including but certainly not limited to the connector 704, services 706-710, a building normalization layer 712, and integrations 714-718, among other components, software, integrations, configuration settings, or any other software-related data described in connection with FIGS. 1-12.

At step 1410, the building system can deploy the one or more gateway components to a BMS server, which may be in communication with one or more building devices via one or more network engines, as shown in FIG. 8. The BMS server can execute one or more BMS applications on the data samples received (e.g., via one or more networks or communication interfaces) from the physical building devices. To deploy the gateway components, the building system can utilize one or more communication channels, which may be established via a network of the building, to transmit the gateway components to the BMS server of the building. Deploying the one or more gateway components can include installing or otherwise configuring the gateway components to execute at the BMS server. Generally, the gateway components can be executed to perform any of the operations described herein. Deploying the gateway components can include forming storing computer-executable instructions corresponding to the gateway components at the BMS server. In some implementations, the particular gateway components deployed at the BMS server can be selected based on the type of the physical building device(s) to which the BMS server is connected (e.g., via the network engine, etc.), or to other types of computing systems with which the BMS server is in communication. Likewise, in some embodiments, the particular gateway components deployed at the BMS server can be selected to correspond to an operation, type, or processing capability of the BMS server, among other factors as described herein. Deploying the gateway components may include storing the gateway components in one or more predetermined memory regions at the BMS server (e.g., in a particular directory, executable memory region, etc.), and may include installing, configuring, or otherwise applying one or more configuration settings for the gateway components or for the operation of the BMS server.

As described herein, the one or more gateway components can include any type of software component, hardware configuration settings, or combinations thereof. The gateway components may include processor-executable instructions, which can be executed by the BMS server to which the gateway component(s) are deployed. The one or more gateway components can cause the BMS server to communicate with the physical building device to receive the one or more data samples (e.g., via one or more networks or communication interfaces). Additionally, the one or more gateway components cause the BMS server to communicate the one or more data samples to the cloud platform. For example, the gateway components can include one or more adapters or communication software APIs that facilitate communication between computing devices within, and external to, the building. The gateway components may include adapters that cause the BMS server to communicate with one or more network engines. The gateway components can include instructions that, when executed by the BMS server, cause the BMS server to detect a new physical building device connected to the BMS server (e.g., by searching through different connected devices by device identifier, etc.), and then search a device library for a configuration of the new physical building device. Using the configuration for the new physical device, the gateway components can cause the BMS server to implement the configuration to facilitate communication with the new physical building device. The gateway components can also perform a discovery process to discover the configuration for the new physical building device and store the configuration in the device library, for example, if the device library did not include the configuration. The device library can be stored at the cloud platform or on the one or more gateway components themselves. In some implementations, the device library is distributed across one or more instances of the one or more gateway components in a plurality of different buildings, and may be retrieved, for example, by accessing one or more networks to communicate with the multiple instances of gateway components to retrieve portions of, or all of, the device library. The gateway components can receive one or more values for control points of the physical building device, for example, from the building system, from the cloud platform, or from another system or device described herein, and communicate the one or more values to the control points of the physical building device via the one or more gateway components.

The one or more gateway components can include a building service that causes the BMS server to generate data based on the one or more data samples, which may be analytics data or any other type of data described herein that may be based on or associated with the data samples. When deploying the gateway components, the building system can identify one or more requirements for the building service, or any other of the gateway components. The requirements may include required processing resources, storage resources, data availability, or a presence of another building service executing at the BMS server. The building system can query the BMS server to determine the current operating characteristics (e.g., processing resources, storage resources, data availability, or a presence of another building service executing at the BMS server, etc.), to determine that the BMS server meets the one or more requirements for the gateway component(s). If the BMS server meets the requirements, the building system can deploy the corresponding gateway components to the BMS server. If the requirements are not met, the building system may deploy the gateway components to another BMS server. The building system can periodically query, or otherwise receive messages from, the BMS server that indicate the current operating characteristics of the BMS server. In doing so, the building system can identify whether the requirements for the building service (or other gateway components) are no longer met by the BMS server. If the requirements are no longer met, the building system can move (e.g., terminate execution of the gateway components or remove the gateway components from the BMS server, and re-deploy the gateway components) the gateway components (e.g., the building service) from the BMS server to a different computing system that meets the one or more requirements of the building service or gateway component(s). In some implementations, the building system can identify communication protocols corresponding to the physical building devices associated with the BMS server, and deploy one or more integration components (e.g., associated with the physical building devices) to the BMS server to communicate with the one or more physical building devices via the one or more communication protocols. The integration components can be part of the one or more gateway components.

Figure 15:
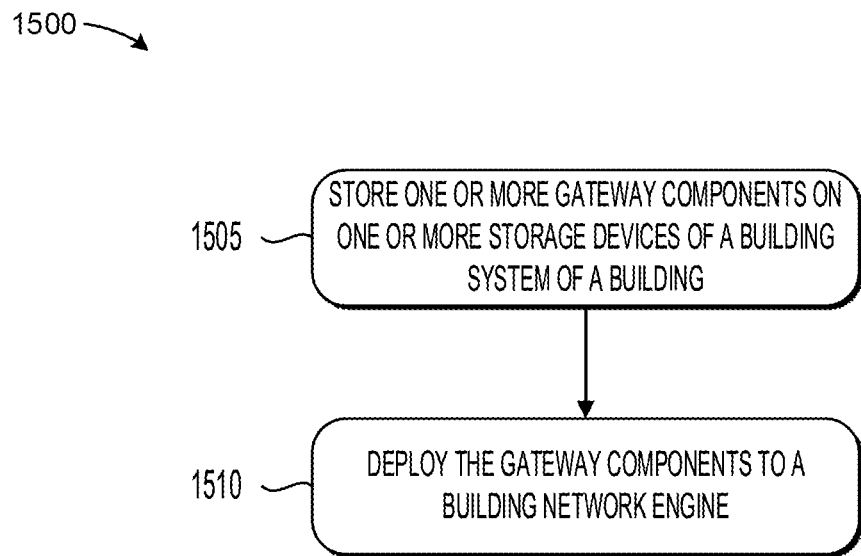
FIG. 15 is a flow diagram of an example method for deploying gateway components on a network engine, according to an exemplary embodiment.

Referring to FIG. 15 is a flow diagram of an example method 1500 for deploying gateway components on a network engine, according to an exemplary embodiment. In various embodiments, the local server 702 performs the method 1500. However, it should be understood that any computing system described herein may perform any or all of the operations described in connection with the method 1500. For example, in some embodiments, the cloud platform 106 performs method 1500. In yet other embodiments, the local server 702 may perform the method 1500. For example, the cloud platform 106 may perform method 1500 to deploy gateway components on one or more computing devices (e.g., the local server 702, the device/gateway 720, the local BMS server 804, the network engine 816, the gateway 1004, the gateway manager 1202, the cluster gateway 1206, any other computing systems or devices described herein, etc.) in a building, which may collect, store, process, or otherwise access data samples received via one or more physical building devices. The data samples may be sensor data, operational data, configuration data, or any other data described herein. The computing system performing the operations of the method 1500 is referred to herein as the "building system."

At step 1505, the building system can store one or more gateway components on one or more storage devices of the building system. The building system may be located within, or located remote from, the building to which the building system corresponds. The gateway components stored on the storage devices of the building system can facilitate communication with a cloud platform (e.g., the cloud platform 106) and facilitate communication with a physical building device (e.g., the device/gateway 720, the building subsystems 122, etc.). The gateway components can be, for example, any of the, connectors, building normalization layers, services, or integrations described herein, including but certainly not limited to the connector 704, services 706-710, a building normalization layer 712, and integrations 714-718, among other components, software, integrations, configuration settings, or any other software-related data described in connection with FIGS. 1-12.

At step 1510, the building system can deploy the one or more gateway components to a network engine, which may implement one or more local communications networks for one or more building devices of the building and receive one or more data samples from the one or more building devices, as described herein. To deploy the gateway components, the building system can utilize one or more communication channels, which may be established via a network of the building, to transmit the gateway components to the Network engine of the building. Deploying the one or more gateway components can include installing or otherwise configuring the gateway components to execute at the network engine. Generally, the gateway components can be executed to perform any of the operations described herein. Deploying the gateway components can include forming storing computer-executable instructions corresponding to the gateway components at the network engine. In some implementations, the particular gateway components deployed at the network engine can be selected based on the type of the physical building device(s) to which the network engine is connected (e.g., via one or more networks implemented by the network engine, etc.), or to other types of computing systems with which the network engine is in communication. Likewise, in some embodiments, the particular gateway components deployed at the network engine can be selected to correspond to an operation, type, or processing capability of the network engine, among other factors as described herein. Deploying the gateway components may include storing the gateway components in one or more predetermined memory regions at the network engine (e.g., in a particular directory, executable memory region, etc.), and may include installing, configuring, or otherwise applying one or more configuration settings for the gateway components or for the operation of the network engine.

As described herein, the one or more gateway components can include any type of software component, hardware configuration settings, or combinations thereof. The gateway components may include processor-executable instructions, which can be executed by the network engine to which the gateway component(s) are deployed. The one or more gateway components can cause the network engine to communicate with the physical building device to receive the one or more data samples (e.g., via one or more networks or communication interfaces). Additionally, the one or more gateway components cause the network engine to communicate the one or more data samples to the cloud platform. For example, the gateway components can include one or more adapters or communication software APIs that facilitate communication between computing devices within, and external to, the building. The gateway components may include adapters that cause the network engine to communicate with one or more other computing systems (e.g., a BMS server, other building subsystems, etc.). The gateway components can include instructions that, when executed by the network engine, cause the network engine to detect a new physical building device connected to the network engine (e.g., by searching through different connected devices by device identifier, etc.), and then search a device library for a configuration of the new physical building device. Using the configuration for the new physical device, the gateway components can cause the network engine to implement the configuration to facilitate communication with the new physical building device. The gateway components can also perform a discovery process to discover the configuration for the new physical building device and store the configuration in the device library, for example, if the device library did not include the configuration. The device library can be stored at the cloud platform or on the one or more gateway components themselves. In some implementations, the device library is distributed across one or more instances of the one or more gateway components in a plurality of different buildings, and may be retrieved, for example, by accessing one or more networks to communicate with the multiple instances of gateway components to retrieve portions of, or all of, the device library. The gateway components can receive one or more values for control points of the physical building device, for example, from the building system, from the cloud platform, or from another system or device described herein, and communicate the one or more values to the control points of the physical building device via the one or more gateway components.

The one or more gateway components can include a building service that causes the network engine to generate data based on the one or more data samples, which may be analytics data or any other type of data described herein that may be based on or associated with the data samples. When deploying the gateway components, the building system can identify one or more requirements for the building service, or any other of the gateway components. The requirements may include required processing resources, storage resources, data availability, or a presence of another building service executing at the network engine. The building system can query the network engine to determine the current operating characteristics (e.g., processing resources, storage resources, data availability, or a presence of another building service executing at the network engine, etc.), to determine that the network engine meets the one or more requirements for the gateway component(s). If the network engine meets the requirements, the building system can deploy the corresponding gateway components to the network engine. If the requirements are not met, the building system may deploy the gateway components to another network engine. The building system can periodically query, or otherwise receive messages from, the network engine that indicate the current operating characteristics of the network engine. In doing so, the building system can identify whether the requirements for the building service (or other gateway components) are no longer met by the network engine. If the requirements are no longer met, the building system can move (e.g., terminate execution of the gateway components or remove the gateway components from the network engine, and re-deploy the gateway components) the gateway components (e.g., the building service) from the network engine to a different computing system that meets the one or more requirements of the building service or gateway component(s). In some implementations, the building system can identify communication protocols corresponding to the physical building devices associated with the network engine, and deploy one or more integration components (e.g., associated with the physical building devices) to the network engine to communicate with the one or more physical building devices via the one or more communication protocols. The integration components can be part of the one or more gateway components.

Figure 16:
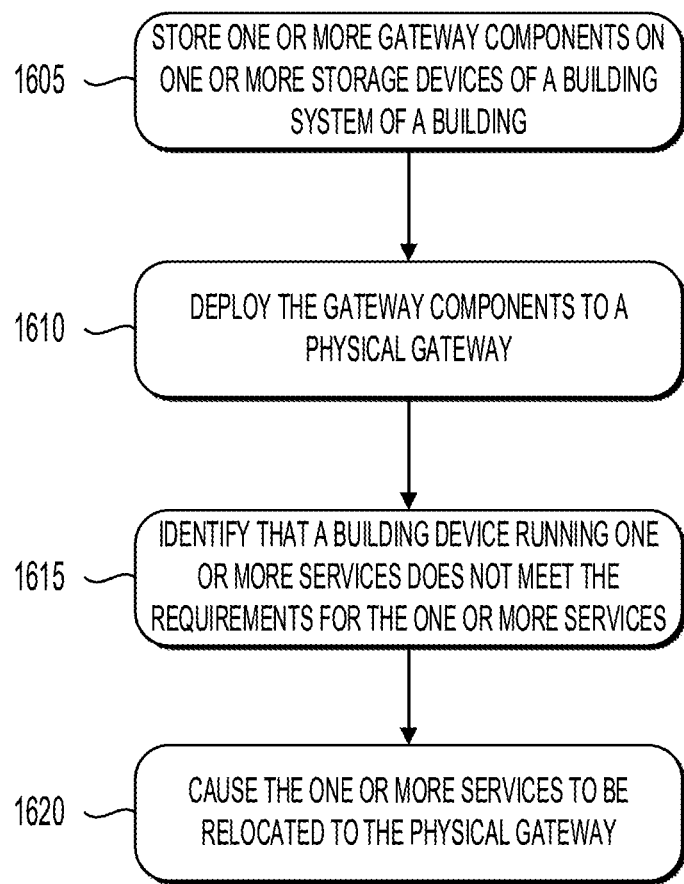
FIG. 16 is a flow diagram of an example method for deploying gateway components on a dedicated gateway, according to an exemplary embodiment.

Referring to FIG. 16 is a flow diagram of an example method 1600 for deploying gateway components on a dedicated gateway, according to an exemplary embodiment. In various embodiments, the local server 702 performs the method 1600. However, it should be understood that any computing system described herein may perform any or all of the operations described in connection with the method 1600. For example, in some embodiments, the cloud platform 106 performs method 1600. In yet other embodiments, the local server 702 may perform the method 1600. For example, the cloud platform 106 may perform method 1600 to deploy gateway components on one or more computing devices (e.g., the local server 702, the device/gateway 720, the local BMS server 804, the network engine 816, the gateway 1004, the gateway manager 1202, the cluster gateway 1206, any other computing systems or devices described herein, etc.) in a building, which may collect, store, process, or otherwise access data samples received via one or more physical building devices. The data samples may be sensor data, operational data, configuration data, or any other data described herein. The computing system performing the operations of the method 1600 is referred to herein as the "building system."

At step 1605, the building system can store one or more gateway components on one or more storage devices of the building system. The building system may be located within, or located remote from, the building to which the building system corresponds. The gateway components stored on the storage devices of the building system can facilitate communication with a cloud platform (e.g., the cloud platform 106) and facilitate communication with a physical building device (e.g., the device/gateway 720, the building subsystems 122, etc.). The gateway components can be, for example, any of the, connectors, building normalization layers, services, or integrations described herein, including but certainly not limited to the connector 704, services 706-710, a building normalization layer 712, and integrations 714-718, among other components, software, integrations, configuration settings, or any other software-related data described in connection with FIGS. 1-12.

At step 1610, the building system can deploy the one or more gateway components to a physical gateway, which may communicate and receive data samples from one or more physical building devices of the building, and provide the data samples to the cloud platform. To deploy the gateway components, the building system can utilize one or more communication channels, which may be established via a network of the building, to transmit the gateway components to the physical gateway of the building. Deploying the one or more gateway components can include installing or otherwise configuring the gateway components to execute at the physical gateway. Generally, the gateway components can be executed to perform any of the operations described herein. Deploying the gateway components can include forming storing computer-executable instructions corresponding to the gateway components at the physical gateway. In some implementations, the particular gateway components deployed at the physical gateway can be selected based on the type of the physical building device(s) to which the physical gateway is connected, or to other types of computing systems with which the physical gateway is in communication. Likewise, in some embodiments, the particular gateway components deployed at the physical gateway can be selected to correspond to an operation, type, or processing capability of the physical gateway, among other factors as described herein. Deploying the gateway components may include storing the gateway components in one or more predetermined memory regions at the physical gateway (e.g., in a particular directory, executable memory region, etc.), and may include installing, configuring, or otherwise applying one or more configuration settings for the gateway components or for the operation of the physical gateway.

As described herein, the one or more gateway components can include any type of software component, hardware configuration settings, or combinations thereof. The gateway components may include processor-executable instructions, which can be executed by the physical gateway to which the gateway component(s) are deployed. The one or more gateway components can cause the physical gateway to communicate with the physical building device to receive the one or more data samples (e.g., via one or more networks or communication interfaces). Additionally, the one or more gateway components cause the physical gateway to communicate the one or more data samples to the cloud platform. For example, the gateway components can include one or more adapters or communication software APIs that facilitate communication between computing devices within, and external to, the building. The gateway components may include adapters that cause the physical gateway to communicate with one or more other computing systems (e.g., a BMS server, other building subsystems, etc.). The gateway components can include instructions that, when executed by the physical gateway, cause the physical gateway to detect a new physical building device connected to the physical gateway (e.g., by searching through different connected devices by device identifier, etc.), and then search a device library for a configuration of the new physical building device. Using the configuration for the new physical device, the gateway components can cause the physical gateway to implement the configuration to facilitate communication with the new physical building device. The gateway components can also perform a discovery process to discover the configuration for the new physical building device and store the configuration in the device library, for example, if the device library did not include the configuration. The device library can be stored at the cloud platform or on the one or more gateway components themselves. In some implementations, the device library is distributed across one or more instances of the one or more gateway components in a plurality of different buildings, and may be retrieved, for example, by accessing one or more networks to communicate with the multiple instances of gateway components to retrieve portions of, or all of, the device library. The gateway components can receive one or more values for control points of the physical building device, for example, from the building system, from the cloud platform, or from another system or device described herein, and communicate the one or more values to the control points of the physical building device via the one or more gateway components.

At step 1615, the building system can identify a building device (e.g., via the gateway on which the gateway components are deployed) that is executing one or more building services that does not meet the requirements for executing the one or more building services. The buildings services, for example, may cause the building device to generate data based on the one or more data samples, which may be analytics data or any other type of data described herein that may be based on or associated with the data samples. The requirements may include required processing resources, storage resources, data availability, or a presence of another building service executing at the building device. The building system can query the building device to determine the current operating characteristics (e.g., processing resources, storage resources, data availability, or a presence of another building service executing at the building device, etc.), to determine that the building device meets the one or more requirements for the building service(s). If the requirements are not met, the building system can perform step 1620. The building system may periodically query the building device to determine whether the building device meets the requirements for the building services.

At step 1620, the building system can cause (e.g., by transmitting computer-executable instructions to the building device and the gateway) the building services to be relocated to the gateway on which the gateway component(s) are deployed. To do so, the building system can move the building services from the building device to the gateway on which the gateway component(s) are deployed, for example, by terminating execution of the building services or removing the building services from the building device, and then re-deploying or copying the building services, including any application state information or configuration information, to the gateway.

Figure 17:
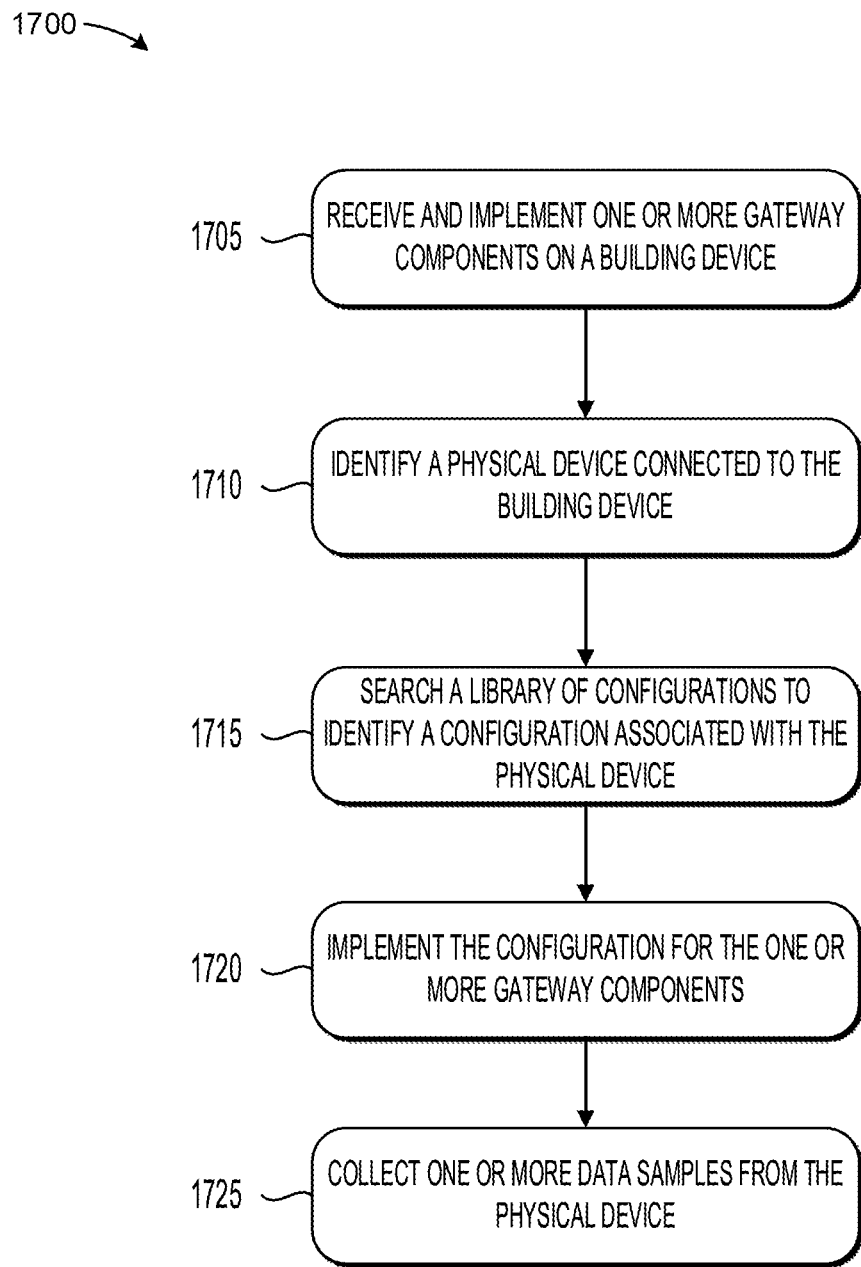
FIG. 17 is a flow diagram of an example method for implementing gateway components on a building device, according to an exemplary embodiment.

Referring to FIG. 17 is a flow diagram of an example method 1700 for implementing gateway components on a building device, according to an exemplary embodiment. In various embodiments, the device/gateway 720 performs the method 1700. However, it should be understood that any computing system on which gateway components are deployed, as described herein, may perform any or all of the operations described in connection with the method 1700. For example, in some embodiments, the BMS server 804, the network engine 816, the gateway 1004, the building broker device 1105, the gateway manager 1202, or the cluster gateway 1206 performs method 1700. In yet other embodiments, the local server 702 may perform the method 1700. The computing system performing the operations of the method 1700 is referred to herein as the "building device."

At step 1705, the building device can receive one or more gateway components and implement the one or more gateway components on the building device. The one or more gateway components can facilitate communication between a cloud platform and the building device. The gateway components can be, for example, any of the, connectors, building normalization layers, services, or integrations described herein, including but certainly not limited to the connector 704, services 706-710, a building normalization layer 712, and integrations 714-718, among other components, software, integrations, configuration settings, or any other software-related data described in connection with FIGS. 1-12. The building device can receive the gateway components from any type of computing device described herein that can deploy the gateway components to the building device, including the cloud platform 106, the BMS server 804, or the network engine 816, among others.

At step 1710, the building device can identify a physical device connected to the building device based on the one or more gateway components. For example, the gateway components can include instructions that, when executed by the physical gateway, cause the physical gateway to detect a physical device connected to the physical gateway (e.g., by searching through different connected devices by device identifier, etc.). then The gateway components can receive one or more values for control points of the physical device, for example, from the building system, from the cloud platform, or from another system or device described herein, and communicate the one or more values to the control points of the physical device via the one or more gateway components.

At step 1715, the building device can search a library of configurations for a plurality of different physical devices with the identity of the physical device to identify a configuration for collecting data samples from the physical device connected to the building device and retrieve the configuration. Search a device library for a configuration of the physical device. The gateway components can also perform a discovery process to discover the configuration for the physical device and store the configuration in the device library, for example, if the device library did not include the configuration. The device library can be stored at the cloud platform or on the one or more gateway components themselves. In some implementations, the device library is distributed across one or more instances of the one or more gateway components in a plurality of different buildings, and may be retrieved, for example, by accessing one or more networks to communicate with the multiple instances of gateway components to retrieve portions of, or all of, the device library.

At step 1720, the building device can implement the configuration for the one or more gateway components. Using the configuration for the physical device, the gateway components can cause the physical gateway to implement the configuration to facilitate communication with the physical device. The configuration may include configuration for communication hardware (e.g., wireless or wired communications interfaces, etc.) that configure the communication hardware to communicate with the physical device. The configuration can specify a communication protocol that can be used to communicate with the physical device, and may include computer-executable instructions that, when executed, cause the building device to execute an API that carries out the communication protocol to communicate with the physical device.

At step 1725, the building device can collect one or more data samples from the physical device based on the one or more gateway components and the configuration. For example, the gateway components or the configuration can include an API, or other computer-executable instructions, that the building device can utilize to communicate with and retrieve one or more data samples from the physical device. The data samples can be, for example, sensor data, operational data, configuration data, or any other data described herein. Additionally, the building device can utilize one or more of the gateway components to communicate the data samples to another computing system, such as the cloud platform, a BMS server, a network engine, or a physical gateway, among others.

Figure 18:
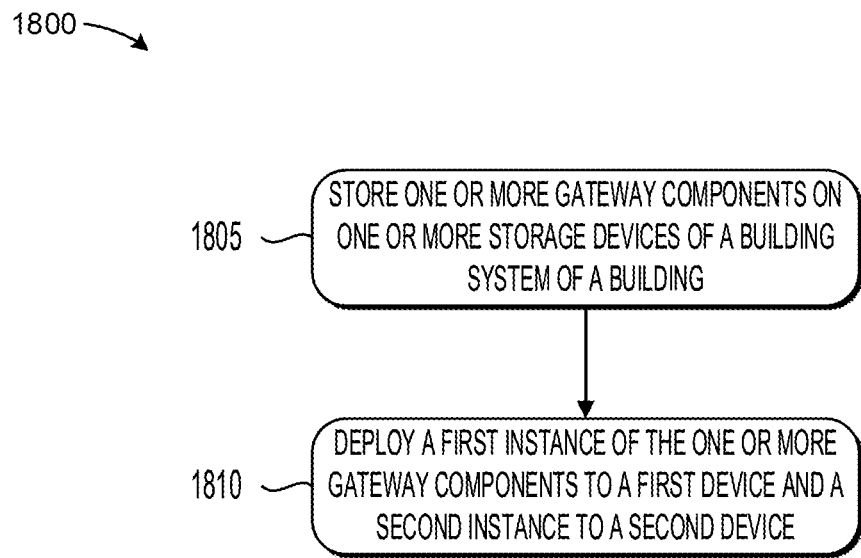
FIG. 18 is a flow diagram of an example method for deploying gateway components to perform a building control algorithm, according to an exemplary embodiment.

Referring to FIG. 18 is a flow diagram of an example method 1800 for deploying gateway components to perform a building control algorithm, according to an exemplary embodiment. In various embodiments, the local server 702 performs the method 1800. However, it should be understood that any computing system described herein may perform any or all of the operations described in connection with the method 1800. For example, in some embodiments, the cloud platform 106 performs method 1800. In yet other embodiments, the local server 702 may perform the method 1800. For example, the cloud platform 106 may perform method 1800 to deploy gateway components on one or more computing devices (e.g., the local server 702, the device/gateway 720, the local BMS server 804, the network engine 816, the gateway 1004, the gateway manager 1202, the cluster gateway 1206, any other computing systems or devices described herein, etc.) in a building, which may collect, store, process, or otherwise access data samples received via one or more physical building devices. The data samples may be sensor data, operational data, configuration data, or any other data described herein. The computing system performing the operations of the method 1800 is referred to herein as the "building system."

At step 1805, the building system can store one or more gateway components on one or more storage devices of the building system. The building system may be located within, or located remote from, the building to which the building system corresponds. The gateway components stored on the storage devices of the building system can facilitate communication with a cloud platform (e.g., the cloud platform 106) and facilitate communication with a physical building device (e.g., the device/gateway 720, the building subsystems 122, etc.). The gateway components can be, for example, any of the, connectors, building normalization layers, services, or integrations described herein, including but certainly not limited to the connector 704, services 706-710, a building normalization layer 712, and integrations 714-718, among other components, software, integrations, configuration settings, or any other software-related data described in connection with FIGS. 1-12.

At step 1810, the building system can a first instance of the one or more gateway components to a first edge device and a second instance of the one or more gateway components to a second edge device. The first edge device can measure a first condition of the building and the second edge device can control the first condition or a second condition of the building. The first edge device (e.g., a building device) can be a surveillance camera, and the first condition can be a presence of a person in the building (e.g., within the field of view of the surveillance camera). The second edge device can be a smart thermostat, and the second condition can be a temperature setting of the building. However, it should be understood that the first edge device and the second edge device can be any type of building device capable of capturing data relating to the building or controlling one or more functions, conditions, or other controllable characteristics of the building. To deploy the gateway components, the building system can utilize one or more communication channels, which may be established via a network of the building, to transmit the gateway components to the first edge device and the second edge device of the building.

Deploying the one or more gateway components can include installing or otherwise configuring the gateway components to execute at the first edge device and the second edge device. Generally, the gateway components can be executed to perform any of the operations described herein. Deploying the gateway components can include forming storing computer-executable instructions corresponding to the gateway components at the first edge device and the second edge device. In some implementations, the particular gateway components deployed at the first edge device and the second edge device can be selected based on the operations, functionality, type, or processing capabilities of the first edge device and the second edge device, among other factors as described herein. Deploying the gateway components may include storing the gateway components in one or more predetermined memory regions at the first edge device and the second edge device (e.g., in a particular directory, executable memory region, etc.), and may include installing, configuring, or otherwise applying one or more configuration settings for the gateway components or for the operation of the first edge device and the second edge device. Gateway components can be deployed to the first edge device or the second edge device based on a communication protocol utilized by the first edge device or the second edge device. The building system can select gateway components to deploy to the first edge device or the second edge device that include computer-executable instructions that allow the first edge device and the second edge device to communicate with one another, and with other computing systems using various communication protocols.

As described herein, the one or more gateway components can include any type of software component, hardware configuration settings, or combinations thereof. The gateway components may include processor-executable instructions, which can be executed by the physical gateway to which the gateway component(s) are deployed. The one or more gateway components can cause the physical gateway to communicate with a building device broker (e.g., the building device broker 1105) to facilitate communication of data samples, conditions, operations, or signals between the first edge device and the second edge device. Additionally, the one or more gateway components cause the first edge device or the second edge device to communicate data samples, operations, signals, or messages to the cloud platform. The gateway components may include adapters or integrations that facilitate communication with one or more other computing systems (e.g., a BMS server, other building subsystems, etc.). The gateway components can cause the first edge device to communicate an event (e.g., a person entering the building, entering a room, or any other detected event, etc.) to the second edge device based on a rule being triggered associated with the first condition. The rule can be, for example, to set certain climate control settings (e.g., temperature, etc.) when a person has been detected. However, it should be understood that any type of user-definable condition can be utilized. The second instance of the one or more gateway components executing at the second edge device can cause the second edge device to control the second condition (e.g., the temperature of the building, etc.) upon receiving the event from the first edge device (e.g., via the building device broker, via the cloud platform, via direct communication, etc.). The building components may include one or more building services that can generate additional analytics data based on detected events, conditions, or other information gathered or processed by the first edge device or the second edge device.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

In various implementations, the steps and operations described herein may be performed on one processor or in a combination of two or more processors. For example, in some implementations, the various operations could be performed in a central server or set of central servers configured to receive data from one or more devices (e.g., edge computing devices/controllers) and perform the operations. In some implementations, the operations may be performed by one or more local controllers or computing devices (e.g., edge devices), such as controllers dedicated to and/or located within a particular building or portion of a building. In some implementations, the operations may be performed by a combination of one or more central or offsite computing devices/servers and one or more local controllers/computing devices. All such implementations are contemplated within the scope of the present disclosure. Further, unless otherwise indicated, when the present disclosure refers to one or more computer-readable storage media and/or one or more controllers, such computer-readable storage media and/or one or more controllers may be implemented as one or more central servers, one or more local controllers or computing devices (e.g., edge devices), any combination thereof, or any other combination of storage media and/or controllers regardless of the location of such devices.

What is claimed is:

1. A building device of a building, comprising:
one or more processors coupled to non-transitory memory, the one or more processors configured to:
receive a gateway component that facilitates communication involving the building device, the gateway component corresponding to a physical device in communication with the building device;
identify, from a library of configurations stored at least in part by a second building device in communication with a second physical device of a same type as the physical device, a configuration for collecting data samples from the physical device;
retrieve the configuration for collecting data samples; and
collect one or more data samples from the physical device based on the gateway component and the configuration.

2. The building device of claim 1, wherein the one or more processors are further configured to:
determine a communication protocol for communicating with the physical device; and
communicate with the physical device via the communication protocol.

3. The building device of claim 1, wherein the one or more processors are further configured to:
receive an adapter service configured to facilitate communication with a network engine; and
transmit, using the adapter service, the one or more data samples to the network engine.

4. The building device of claim 1, wherein the gateway component is further configured to facilitate communication between the building device and a cloud platform, and wherein the one or more processors are further configured to transmit, based on the gateway component, the one or more data samples to the cloud platform.

5. The building device of claim 1, wherein at least a portion of the library of configurations is stored via a cloud platform.

6. The building device of claim 1, wherein at least a portion of the library of configurations is distributed across a plurality of devices in a plurality of different buildings.

7. The building device of claim 1, wherein the one or more processors are further configured to generate, using a building service, data based on the one or more data samples.

8. The building device of claim 1, wherein the library of configurations is stored by a second instance of the gateway component implemented on the second building device.

9. The building device of claim 1, wherein the one or more processors are further configured to:
execute a component configured to facilitate communication with a building management system (BMS) server; and
provide the one or more data samples to the BMS server.

10. The building device of claim 1, wherein the one or more processors are further configured to:
provide an indication to a cloud platform that the building device is in communication with the physical device; and
receive the gateway component in response to the indication.

11. A method, comprising:
receiving, by one or more processors of a building device of a building, a gateway component that facilitates communication involving the building device, the gateway component corresponding to a physical device in communication with the building device;
identifying, by the one or more processors, from a library of configurations stored at least in part by a second building device in communication with a second physical device of a same type as the physical device, a configuration for collecting data samples from the physical device;
retrieving, by the one or more processors, the configuration for collecting data samples; and
collecting, by the one or more processors, one or more data samples from the physical device based on the gateway component and the configuration.

12. The method of claim 11, further comprising:
determining, by the one or more processors, a communication protocol for communicating with the physical device; and
communicating, by the one or more processors, with the physical device via the communication protocol.

13. The method of claim 11, further comprising:
receiving, by the one or more processors, an adapter service configured to facilitate communication with a network engine; and
transmitting, by the one or more processors, using the adapter service, the one or more data samples to the network engine.

14. The method of claim 11, wherein the gateway component is further configured to facilitate communication between the building device and a cloud platform, the method further comprising transmitting, by the one or more processors, based on the gateway component, the one or more data samples to the cloud platform.

15. The method of claim 11, wherein at least a portion of the library of configurations is stored via a cloud platform.

16. The method of claim 11, wherein at least a portion of the library of configurations is distributed across a plurality of devices in a plurality of different buildings.

17. The method of claim 11, further comprising generating, by the one or more processors, using a building service, data based on the one or more data samples.

18. The method of claim 11, wherein the library of configurations is stored by a second instance of the gateway component implemented on the second building device.

19. The method of claim 11, further comprising:
executing, by the one or more processors, a component configured to facilitate communication with a building management system (BMS) server; and
providing, by the one or more processors, the one or more data samples to the BMS server.

20. A non-transitory computer-readable medium with instructions embodied thereon that, when executed by one or more processors of a building device of a building, cause the one or more processors to perform operations comprising:
receiving a gateway component that facilitates communication involving the building device, the gateway component corresponding to a physical device in communication with the building device;
identifying, from a library of configurations stored at least in part by a second building device in communication with a second physical device of a same type as the physical device, a configuration for collecting data samples from the physical device;

retrieving the configuration for collecting data samples; and collecting one or more data samples from the physical device based on the gateway component and the configuration.

* * * * *